(12) United States Patent
Matsuda et al.

(10) Patent No.: US 8,448,199 B2
(45) Date of Patent: May 21, 2013

(54) PLAYER AND SPINDLE MOTOR WITH SKIRT SECTION HAVING RESIN LEAD-IN FEATURES

(75) Inventors: Mikinori Matsuda, Kanagawa (JP); Kazuhito Kurita, Kanagawa (JP); Masaki Shinotsuka, Chiba (JP); Yudai Kato, Chiba (JP)

(73) Assignee: Sony Corporation, Tokyo (JP)

( * ) Notice: Subject to any disclaimer, the term of this patent is extended or adjusted under 35 U.S.C. 154(b) by 1433 days.

(21) Appl. No.: 11/986,267

(22) Filed: Nov. 20, 2007

(65) Prior Publication Data

US 2008/0222668 A1    Sep. 11, 2008

(30) Foreign Application Priority Data

Nov. 27, 2006  (JP) ................ 2006-317907

(51) Int. Cl.
  *G11B 17/03* (2006.01)
  *G11B 17/028* (2006.01)
(52) U.S. Cl.
  USPC ........................................... 720/695
(58) Field of Classification Search
  USPC ............................... 720/695, 696
  See application file for complete search history.

(56) References Cited

U.S. PATENT DOCUMENTS

| | | |
|---|---|---|
| 5,907,206 A | 5/1999 | Shiga et al. |
| 6,181,671 B1 | 1/2001 | Ikawa et al. |
| 6,445,096 B1 | 9/2002 | Saito et al. |

FOREIGN PATENT DOCUMENTS

| | | |
|---|---|---|
| EP | 0613229 A1 | 8/1994 |
| JP | 09-153253 A | 6/1997 |
| JP | 10-241273 | 9/1998 |
| JP | 2002-343016 A | 11/2002 |
| JP | 2004-139689 A | 5/2004 |
| JP | 2005-322318 A | 11/2005 |

*Primary Examiner* — Adam R Giesy
*Assistant Examiner* — Gustavo Polo
(74) *Attorney, Agent, or Firm* — Wolf, Greenfield & Sacks, P.C.

(57) ABSTRACT

A spindle motor includes a rotor made of metal including a substantially circular top surface section and a tubular skirt section arranged at a predetermined space from an outer periphery of the top surface section and a disk table of synthetic resin outsert-molded in the rotor and including a table main body section located on an outer surface side of the rotor and a rotor-inner-surface superimposing section located on an inner surface side of the rotor. First resin lead-in holes are provided in the tubular skirt section and an inner surface of the table main body section located on the outer surface side of the rotor is connected to the rotor-inner-surface superimposing section located on the inner surface side of the rotor through the first resin lead-in holes.

15 Claims, 28 Drawing Sheets

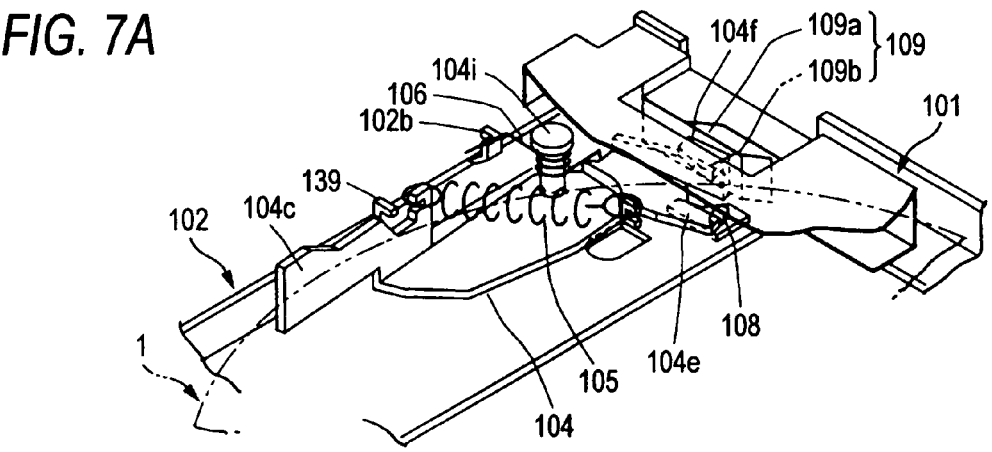
FIG. 7A
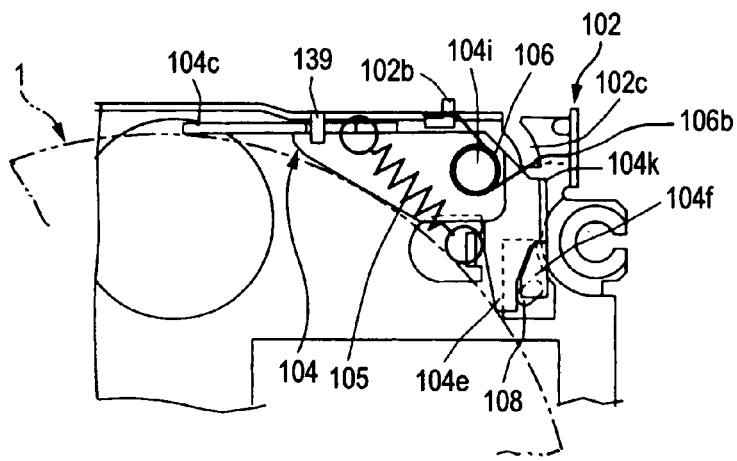
FIG. 7B
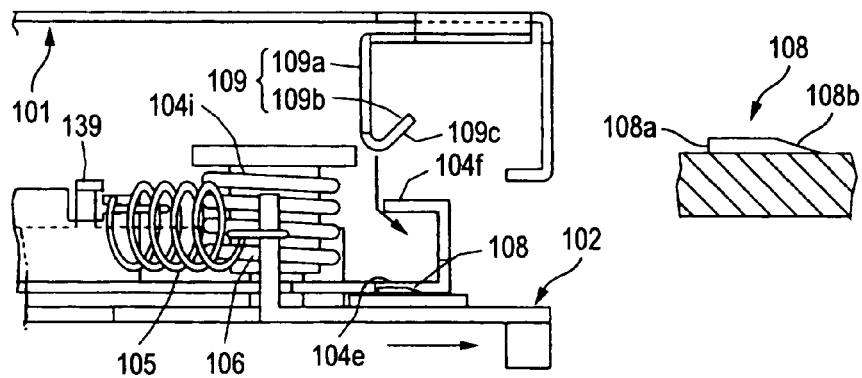
FIG. 7C
FIG. 7D

PLAYER AND SPINDLE MOTOR WITH SKIRT SECTION HAVING RESIN LEAD-IN FEATURES

CROSS-REFERENCES TO RELATED APPLICATIONS

The present invention contains subject matter related to Japanese Patent Application JP 2006-317907 filed in the Japanese Patent Office on Nov. 27, 2006, the entire contents of which being incorporated herein by reference.

BACKGROUND OF THE INVENTION

1. Field of the Invention

The present invention relates to a spindle motor, a rotor assembly used in the spindle motor, and a player including the spindle motor.

2. Description of the Related Art

As shown in FIGS. 34 and 35, in a player for a disk and the like, a spindle motor 301 is attached to be erected on the upper surface side of a chassis 303 by a screw 304 or the like by placing a stator substrate 302 serving as a motor support plate on the upper surface of the chassis 303. The spindle motor 301 includes a tubular bearing section 305 provided in the stator substrate 302, a bearing 306 attached to the inner periphery of the bearing section 305, a wiring board 307 attached on the stator substrate 302, an iron-core coil 308 attached to the outer periphery of the tubular bearing section 305, a rotating shaft 309 attached to the bearing 306, and a rotor assembly 310 attached to the tip of the rotating shaft 309.

The rotor assembly 310 includes a rotor 311 made of metal and a disk table 312 of synthetic resin outsert-molded in the rotor 311. A rotor magnet 313 forming a pair with the iron-core coil 308 is attached to the inner peripheral surface of the rotor 311. A chucking magnet 314 that magnetically chucks a hub of a disk-like recording medium is attached to the upper surface of the disk table 312. A centering spring 315 is arranged at the outer periphery of the magnet 314.

As shown in FIG. 36 in which the rotor 311 and the disk table 312 are separated, the rotor 311 has a substantially circular top surface section 311a and a tubular skirt section 311b. The disk table 312 is outsert-molded with the tubular skirt section 311b arranged at a predetermined space 311c from the outer periphery of the top surface section 311a. On the other hand, the disk table 312 includes a table main body section 312a located on the outer surface side of the rotor 311 and a rotor-inner-surface superimposing section 312b that is located on the inner surface side of the rotor 311 and integrally combine the table main body section 312a with the rotor 311. When the disk table 312 is resin-molded, the rotor-inner-surface superimposing section 312b is formed by extending a part of the resin to the inner surface side of the rotor 311 through the space 311c between the top surface section 311a and the tubular skirt section 311b (see, for example, JP-A-2005-322318).

SUMMARY OF THE INVENTION

In the spindle motor 301 in the past, as shown in FIG. 35, an end 312c on the outer peripheral side of the rotor-inner-surface superimposing section 312b is separated by the skirt section 311b of the rotor 311 to be disconnected from the table main body section 312a. Thus, as indicated by an alternate long and two short dashes line in FIG. 35, the rotor-inner-surface superimposing section 312b may be deformed to be twisted. The table main body section 312a and the rotor 311 are poorly united.

When the table main body section 312a thermally shrinks in a cold region or the like, the table main body section 312a is lifted because of a difference in a shrinkage factor between the table main body section 312a and the rotor 311 made of metal. This makes it difficult to maintain accuracy of height position of the disk table 312 and tends to cause wobble or the like of the disk table 312.

Thus, it is conceivable to increase the thicknesses of the table main body section 312a and the rotor-inner-surface superimposing section 312b to prevent the deformation. However, when the thicknesses of the table main body section 312a and the rotor-inner-surface superimposing section 312b are increased, the thicknesses of the rotor 311 and the like are also increased.

Therefore, it is desirable to provide a spindle motor and a player having high reliability in which the unity of a table main body section and a rotor is improved and the lift of the table main body section from the rotor and the occurrence of wobble of the table main body are prevented.

According to an embodiment of the present invention, there is provided a spindle motor including a rotor made of metal and a disk table of synthetic resin outsert-molded in the rotor, the rotor including a substantially circular top surface section and a tubular skirt section arranged at a predetermined space from the outer periphery of the top surface section and the disk table including a table main body section located on the outer surface side of the rotor and a rotor-inner-surface superimposing section located on the inner surface side of the rotor, wherein first resin lead-in holes are provided at the upper end of the tubular skirt section and the inner surface of the table main body section located on the outer surface side of the rotor is connected to the rotor-inner-surface superimposing section located on the inner surface side of the rotor through the first resin lead-in holes.

When the disk table is outsert-molded in the rotor, the inner surface of the table main body section and the inner surface of the rotor-inner-surface superimposing section are connected in the skirt section by the first resin lead-in holes. Therefore, the coupling of the rotor and the disk table is reinforced and the lift and the wobble of the disk table are prevented.

BRIEF DESCRIPTION OF THE DRAWINGS

FIG. 7A is a perspective view of the eject lever section in a locked state;

FIG. 7B is a plan view of the eject lever section in the locked state;

FIG. 7C is a side view of the eject lever section in the locked state;

FIG. 7D is a sectional view of an eject-lever lock section;

DESCRIPTION OF THE PREFERRED EMBODIMENTS

Embodiments of the present invention will be hereinafter explained in detail.

(1) Schematic Structure of an Entire Player

Figure 1:
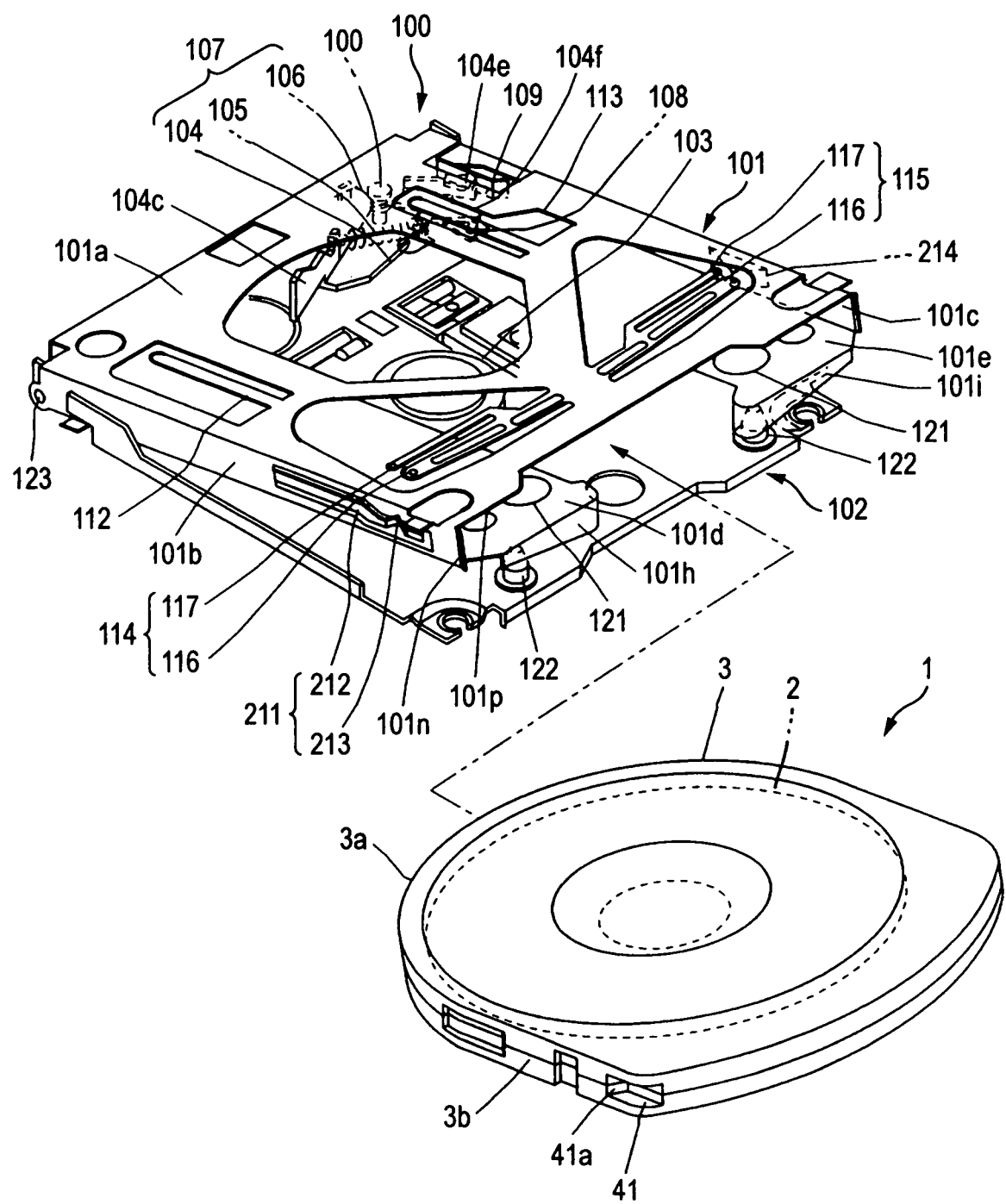
FIG. 1 is a perspective view of a player in which a cartridge holder is in an inserting and removing position.
Figure 2:
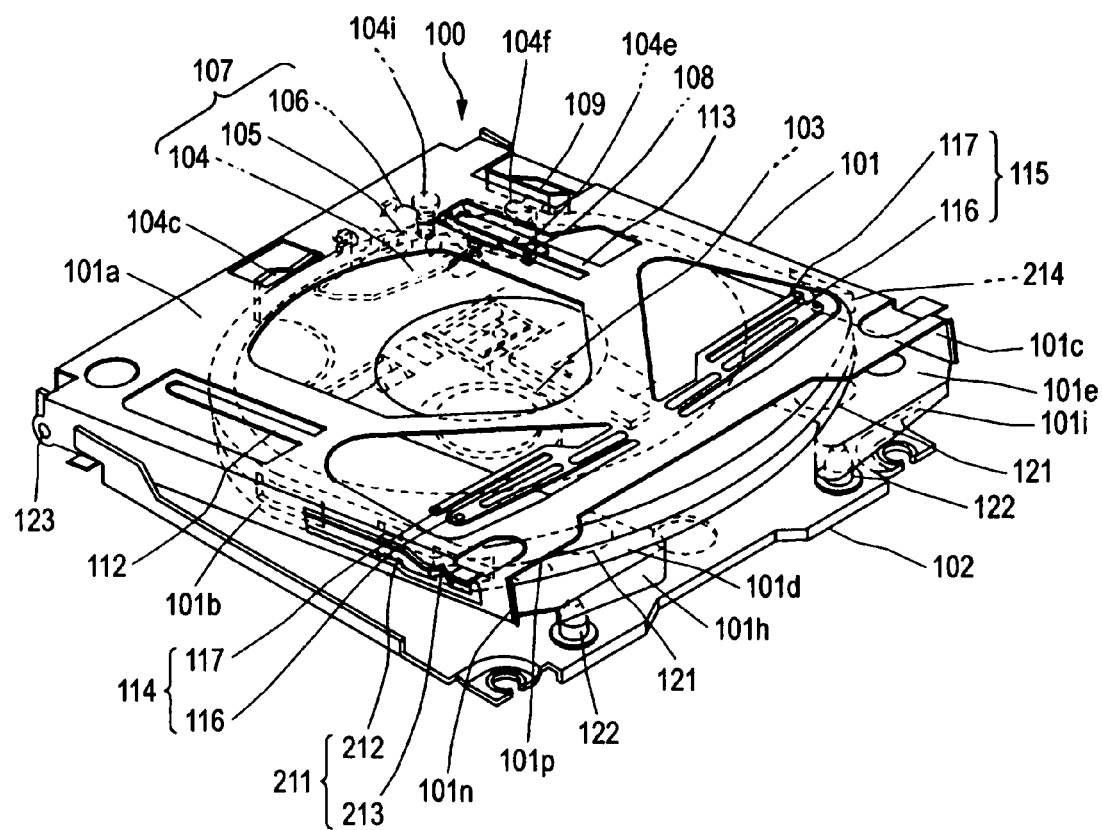
FIG. 2 is a perspective view of the player in which a disk cartridge is inserted in the cartridge holder.
Figure 3:
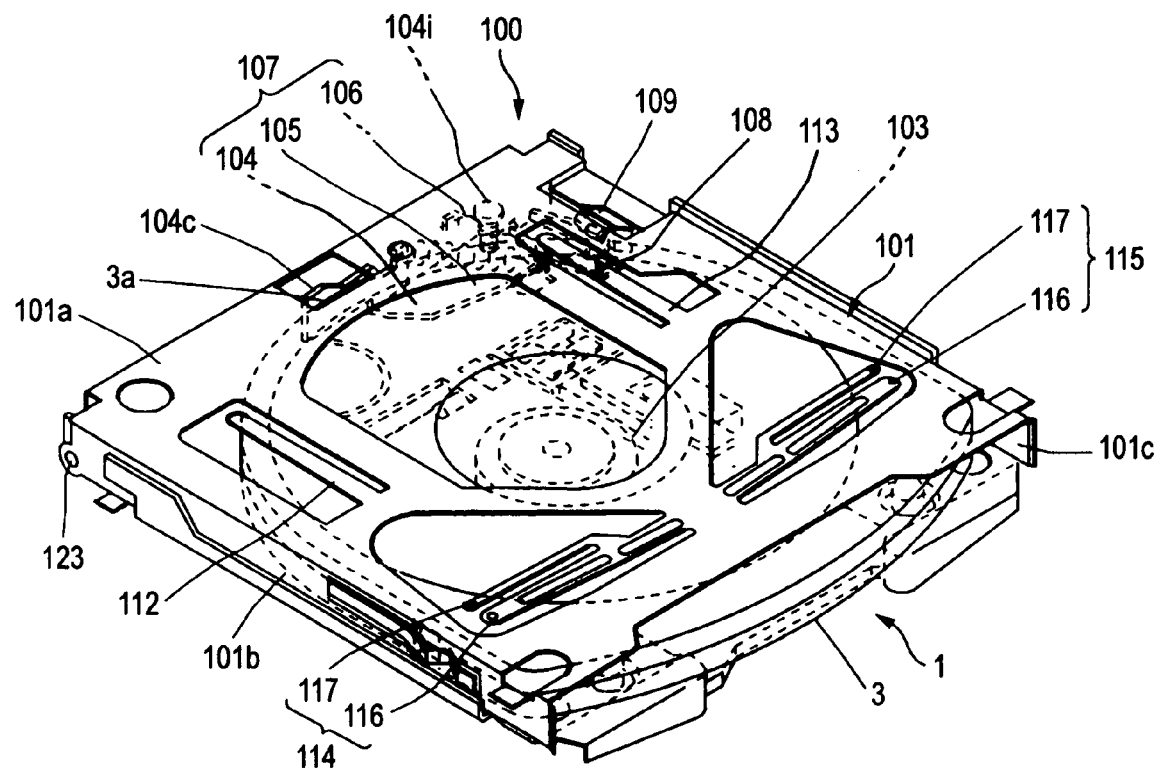
FIG. 3 is a perspective view of the player in which the cartridge holder is in a recording and playing position.
Figure 4:
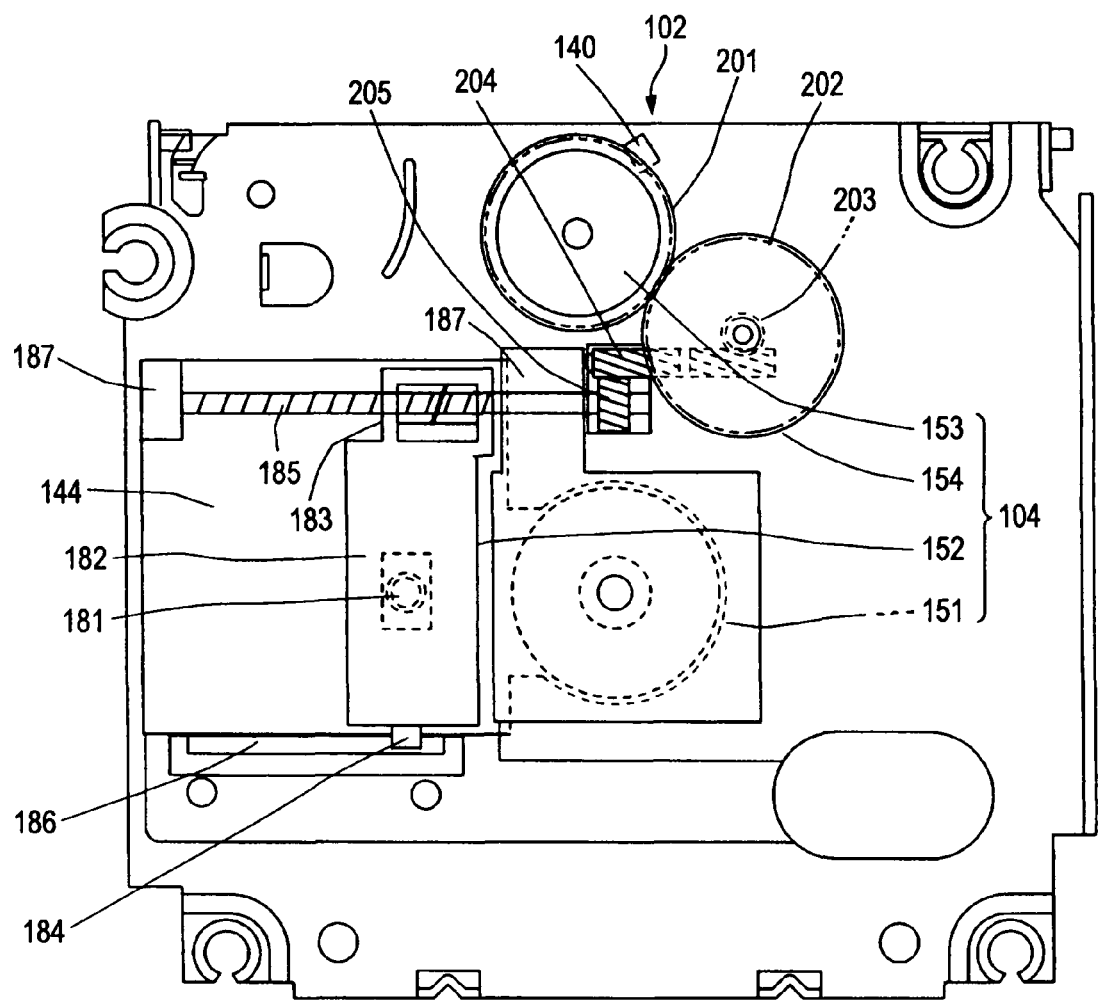
FIG. 4 is a plan view of the player viewed from the rear side thereof.
Figure 5:
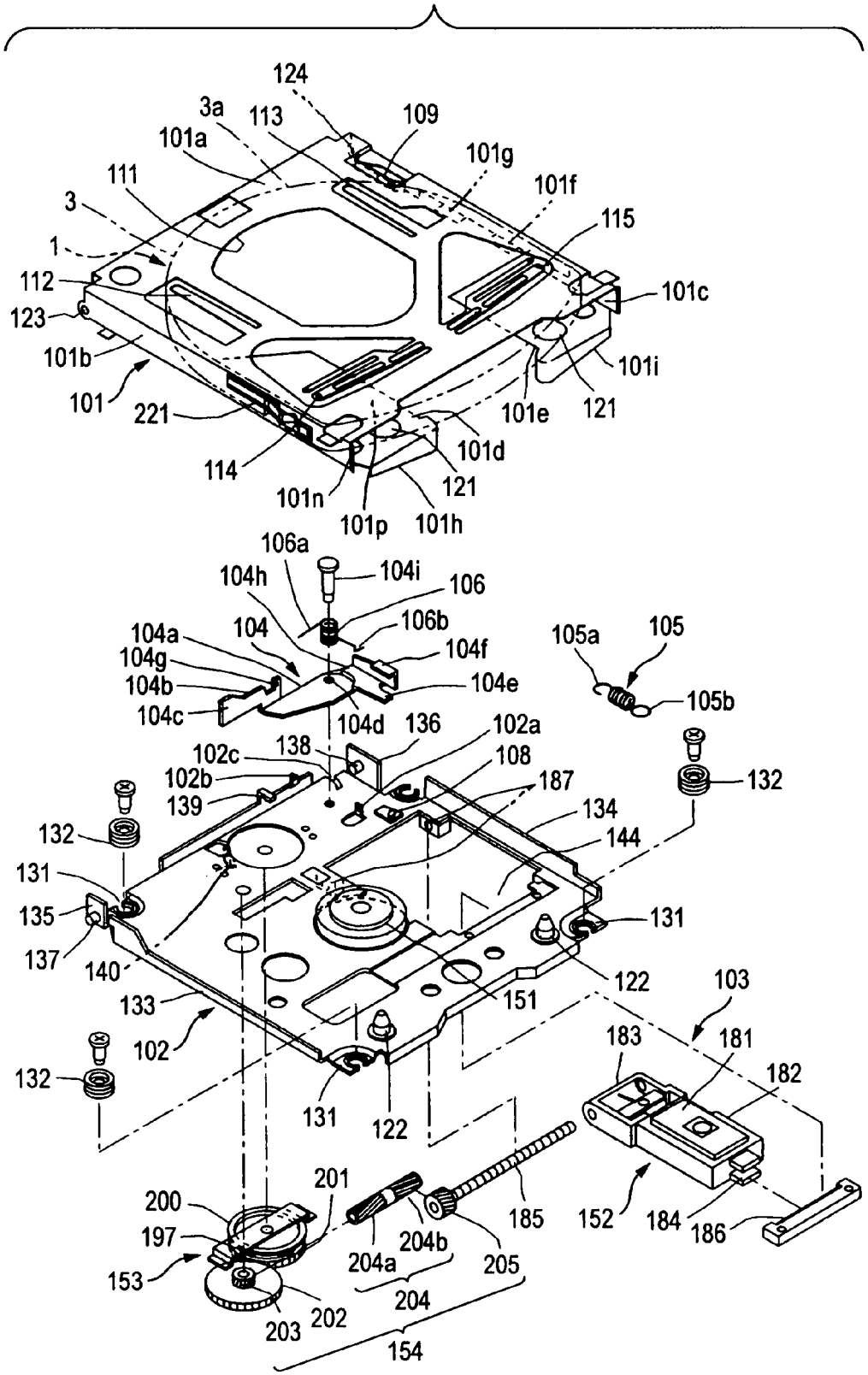
FIG. 5 is a disassembled perspective view of the player.

FIG. 1 is a perspective view of a player 100 in which a cartridge holder 101 is present in a cartridge inserting and removing position. FIG. 2 is a perspective view of the player 100 in which a disk cartridge 1 is housed in the cartridge holder 101. FIG. 3 is a perspective view of the player 100 in which the cartridge holder 101 is in a recording and playing position. FIG. 4 is a plan view of the player 100 viewed from the rear surface side thereof. FIG. 5 is a disassembled view of the player 100.

The player 100 includes the cartridge holder 101 in which the disk cartridge 1 is inserted and held, a chassis 102 that supports the cartridge holder 101 to be movable between the cartridge inserting and removing position and the recording and playing position, a recording and playing mechanism 103 provided in the chassis 102 and including an optical pickup, a spindle motor, and a thread motor that perform recording and playing of a disk in the disk cartridge 1, a disk cartridge eject mechanism 107 including an eject lever 104 that is provided in the chassis 102 to be rotatable in inserting and removing directions of the disk cartridge 1 (hereinafter simply referred to as "rotatable") and movable in directions toward and away from the chassis 102 and is pushed by the disk cartridge 1 inserted into the cartridge holder 101 and rotates, an eject spring 105 that gives a rotation force in a disk cartridge ejecting direction and a force in a direction for pressing against the upper surface of the chassis 102 to the eject lever 104, and a damper spring 106 that gives a braking force to the eject lever 104, an eject-lever lock section 108 that locks (positions and engages) the eject lever 104, which is rotated by the insertion of the disk cartridge 1, in the chassis 102, and an eject-lever unlock section 109 that unlocks (disengages) the eject lever 104 locked by the eject-lever lock section 108 when the cartridge holder 101 is rotated from the recording and playing position to the cartridge inserting and removing position.

The eject-lever unlock section 109 is provided in the cartridge holder 101. When the cartridge holder 101 is rotated from the recording and playing position to the cartridge inserting and removing position, the eject-lever unlock section 109 pushes up the eject lever 104 and unlocks the eject lever 104 locked by the eject-lever lock section 108.

As shown in FIG. 1 and FIGS. 6A to 6C, when the disk cartridge 1 is inserted into the cartridge holder 101 in a state in which the cartridge holder 101 is present in the cartridge inserting and removing position (a state in which the cartridge holder 101 is inclined at a predetermined inclination angle with respect to the chassis 102), a pressed section 104c of the eject lever 104 is pushed by the front surface of the disk cartridge 1. The eject lever 104 rotates around a shaft section 104i in the clockwise direction against a spring force of the eject spring 105.

As shown in FIG. 2 and FIGS. 7A to 7C, when the disk cartridge 1 is inserted to a predetermined position of the cartridge holder 101, a locked section 104e of the eject lever 104 surmounts the eject-lever lock section 108 and engages with one end 108 of the eject-lever lock section 108. Consequently, the return rotation of the eject lever 104 is prevented.

As shown in FIG. 7D, the one end 108a of the eject level lock section 108 is formed as a substantially vertical surface. The locked section 104e of the eject lever 104 surely engages with the one end 108a. On the other hand, the other end 108b of the eject-lever lock section 108 is formed as an inclined surface. The locked section 104e of the eject lever 104 surmounts the eject-lever lock section 108.

Figure 8A:
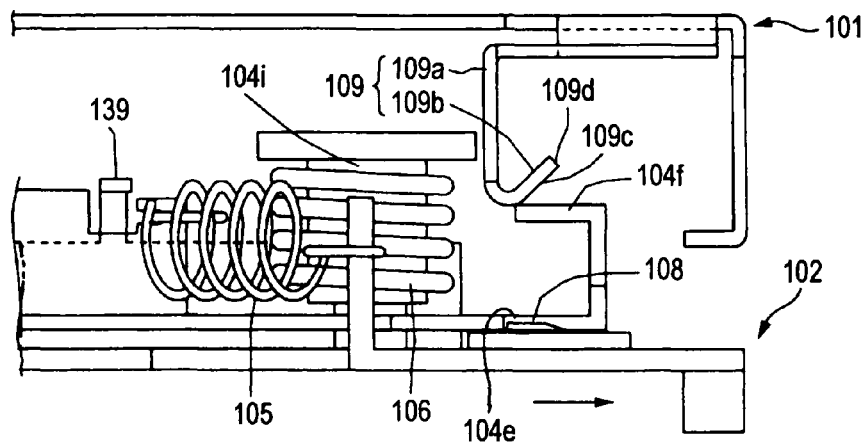
FIG. 8A is a side view of a state in which an eject-lever unlock member is engaged with an unlock-member engaging section.
Figure 8B:
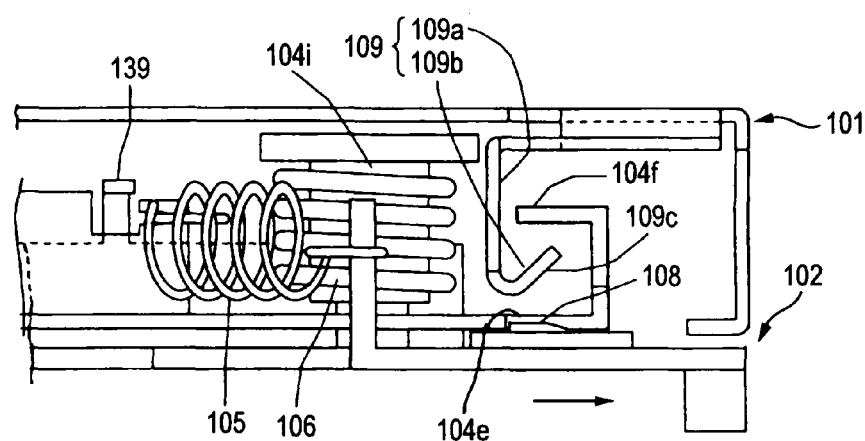
FIG. 8B is a side view of a state in which the eject-lever unlock member is disengaged from the unlock-member engaging section.

When the disk cartridge 1 is inserted to move the cartridge holder 101 to the recording and playing position as shown in FIG. 3, as shown in FIG. 8A, an outer side surface 109c of a ratchet-like pawl 109b of the eject-lever lock section 109 comes into contact with the tip of an unlock-member engaging section 104f of the eject lever 104, the eject-lever unlock section 109 bends in the portion of an arm section 109a, and the pawl 109b moves in a direction in which the pawl 109b escapes from the unlock-member engaging section 104f. When the pawl 109b passes the unlock-member engaging section 104f, as shown in FIG. 8B, the pawl 109b returns to an original position thereof and enters the lower surface side of the unlock-member engaging section 104f to be engageable with the lower surface of the unlock-member engaging section 104f. In this state, recording and playing of an optical disk are performed.

Figure 8C:
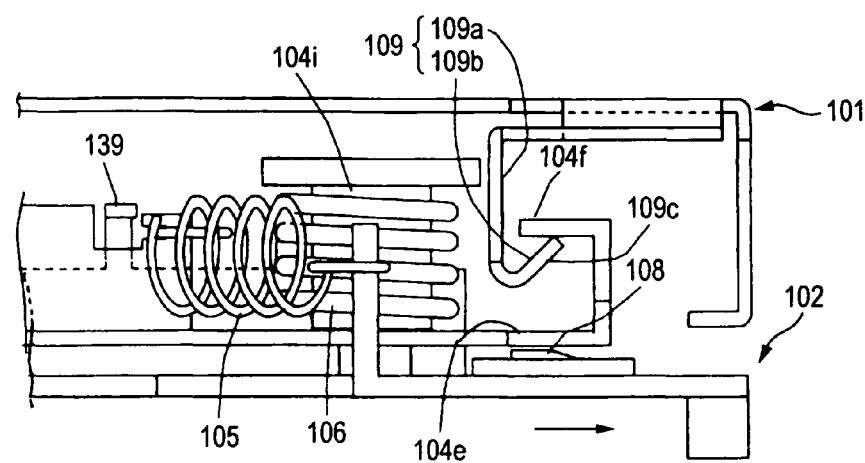
FIG. 8C is a side view of a state in which the unlock-member engaging section is lifted by the eject-lever unlock member.

When the cartridge holder 101 is moved to the cartridge inserting and removing position after the recording and playing are finished, as shown in FIG. 8C, the eject lever 104 is lifted by the pawl 109b of the eject-lever unlock section 109. The eject lever 104 locked by the eject-lever lock section 108 is disengaged (unlocked). The eject lever 104 return-rotates in the counterclockwise direction with the eject spring 105. During the return rotation, the eject lever 104 is given with a braking force by the damper spring 106 and slowly rotates to push out the disk cartridge 1 from the cartridge holder 101.

The recording and playing mechanism 103 includes a spindle motor 151, an optical pickup 152, a thread motor 153, and a transmission gear group 154 that transmits the rotation of the thread motor 153 to the optical pickup 152.

When the disk cartridge 1 is inserted into the cartridge holder 101 and moved to the recording and playing position, the optical disk in the cartridge holder 101 is chucked on the spindle motor 151 in the cartridge holder 101 and driven to rotate. Recording and playing of the optical disk are performed while the optical pickup 152 is moved in a radial direction of the optical disk by the thread motor 153 and the transmission gear group 154.

(2) Structure of the Spindle Motor

Figure 20:
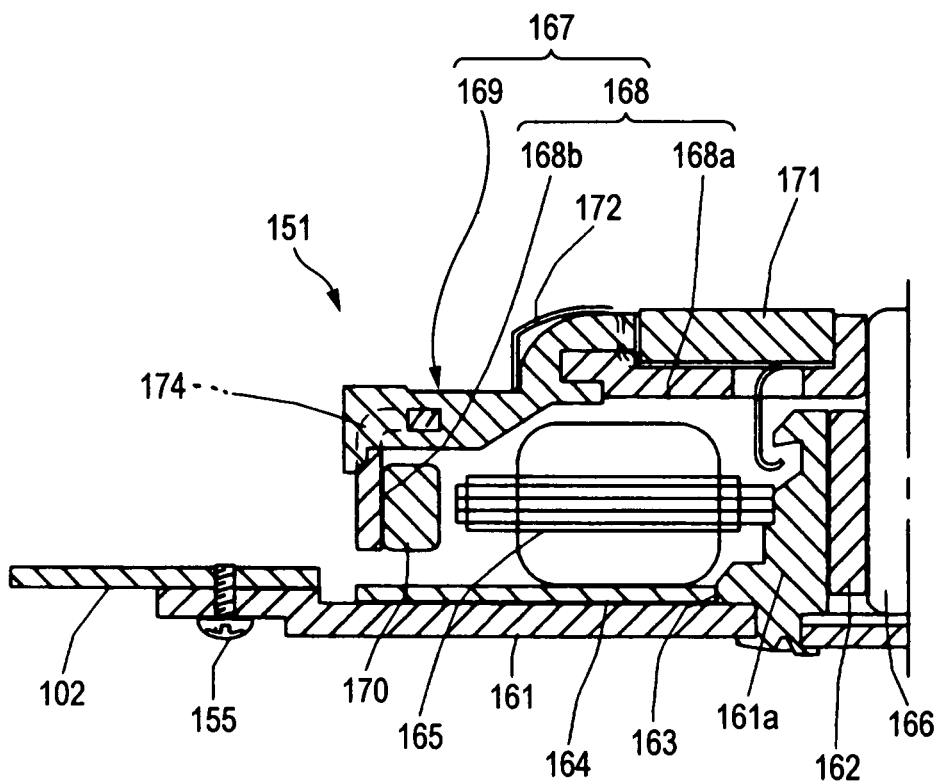
FIG. 20 is a sectional view of a spindle motor.

As shown in FIG. 20, the spindle motor 151 includes a tubular bearing section 161a provided in a stator substrate 161, a bearing 162 attached to the inner periphery of the bearing section 161a, a wiring board 164 placed on the stator substrate 161 with the tubular bearing section 161a inserted in a center hole 163, an iron-core coil 165 attached to the outer periphery of the tubular bearing section 161a, and a rotor assembly 167 rotatably attached with the tip of a rotating shaft 166 inserted in the bearing 162. The rotor assembly 167 includes a rotor 168 and a disk table 169 of synthetic resin outsert-molded in the rotor 168.

A rotor magnet 170 forming a pair with the iron-core coil 165 is attached to the inner surface of the rotor 168. A chucking magnet 171 that magnetically chucks a hub 22 of a disk-like recording medium 2 and a centering spring 172 that performs centering of the disk-like recording medium 2 are attached to the disk table 169.

Figure 21:
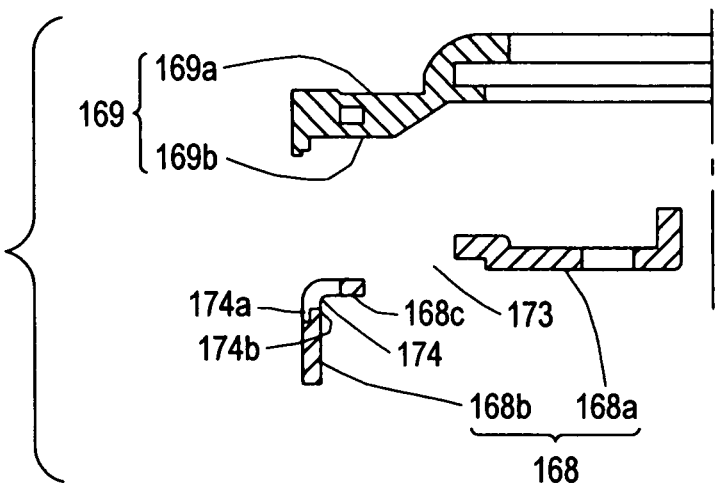
FIG. 21 is a disassembled sectional view of main parts of a rotor and a disk table of the spindle motor.

As shown in a disassembled sectional view in FIG. 21, the rotor assembly 167 includes the rotor 168 made of metal and the disk table 169 of synthetic resin outsert-molded in the rotor 168.

The rotor 168 includes a substantially circular top surface section 168a and a tubular skirt section 168b arranged at a predetermined space 173 from the outer periphery of the top surface section 168a. At the upper end of the tubular skirt section 168b, a ring-like flange section 168c is formed by bending the upper end to the inner side at a substantially right angle.

In the bent portion at the upper end of the skirt section 168b, first resin lead-in holes 174 are formed. The first resin lead-in holes 174 are provided in a row at predetermined intervals in the peripheral direction of the tubular skirt section 168b.

The disk table 169 includes a table main body section 169a located on the outer surface side of the rotor 168 and a rotor-inner-surface superimposing section 169b located on the inner surface side of the rotor 168.

Figure 22:
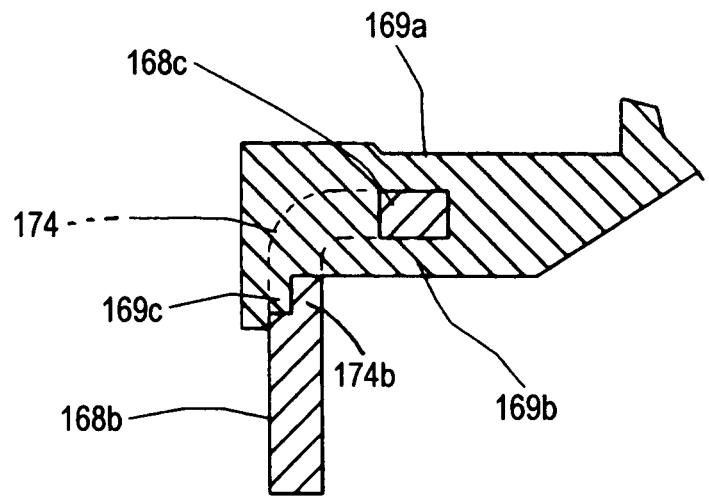
FIG. 22 is a sectional view of a state in which the main parts of the rotor and the disk table of the spindle motor are combined.

The disk table 169 is outsert-molded by, after positioning and arranging the top surface section 168a and the tubular skirt section 168b of the rotor 168 in a molding die at a predetermined space 173, injecting molten resin into the molding die. As shown in FIG. 22, the inner surface of the table main body section 169a and the outer surface of the rotor-inner-surface superimposing section 169b are coupled by the space 173 and the first resin lead-in holes 174, whereby the coupling of the rotor 168 and the disk table 169 is reinforced. As shown in FIG. 21, at the lower end side of the peripheral edge of the resin lead-in holes 174, the inner surface side is formed as a thin section 174a by forming a recess 174a on the outer surface side. This reinforces the table main body section 169a by increasing the thickness of a section 169c corresponding to the recess 174a of the table main body section 169a as shown in FIG. 22 by leading a part of the resin into the recess 174a when the disk table 169 is insert-molded.

Figure 23:
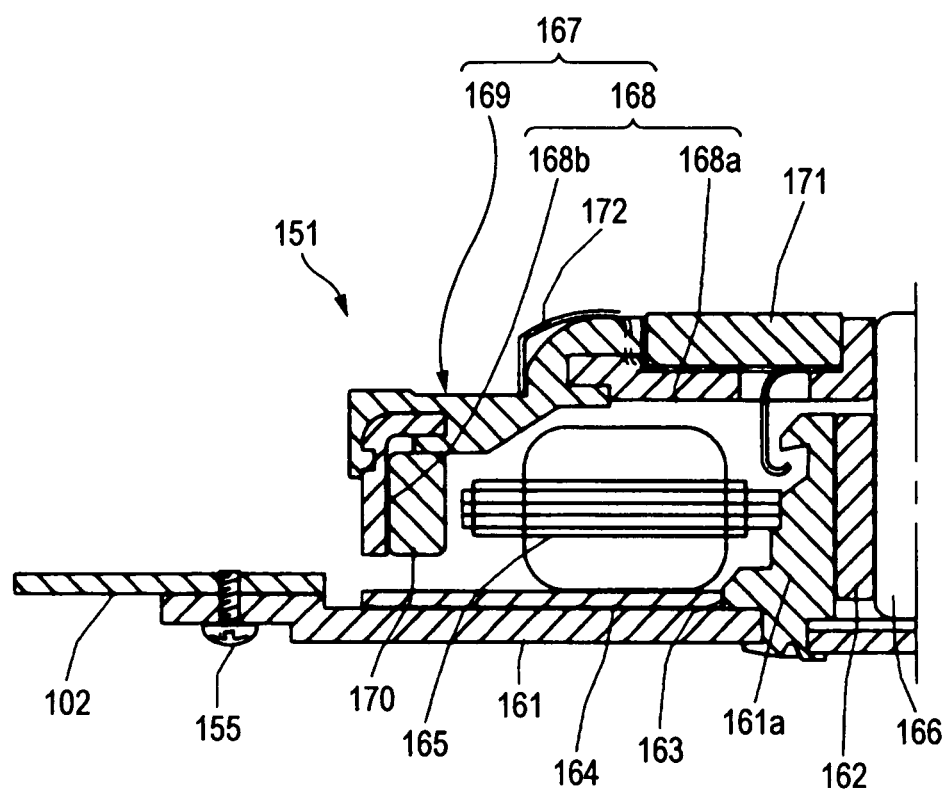
FIG. 23 is a sectional view of a spindle motor according to a second embodiment of the present invention.
Figure 24:
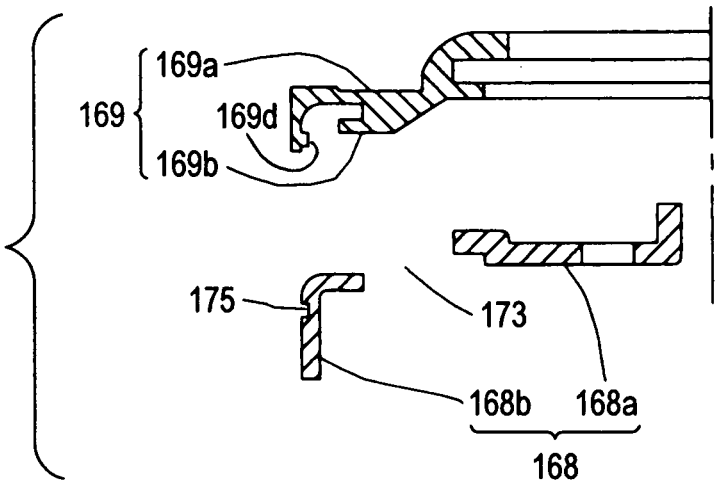
FIG. 24 is a disassembled sectional view of main parts of a rotor and a disk table of the spindle motor according to the second embodiment.
Figure 25:
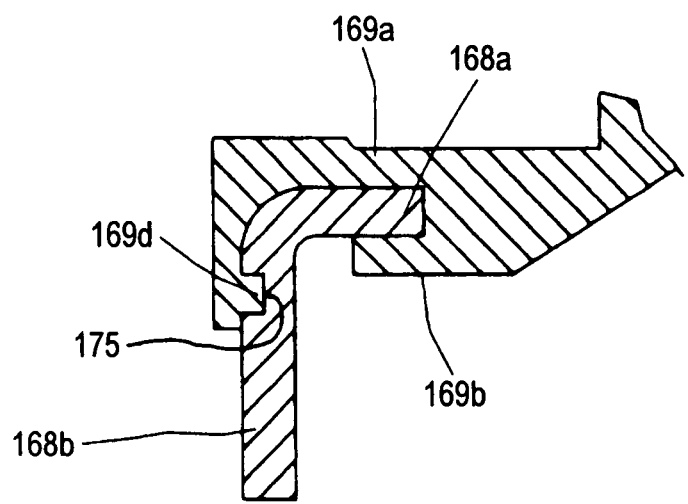
FIG. 25 is a sectional view of a state in which the main parts of the rotor and the disk table of the spindle motor according to the second embodiment are combined.

FIGS. 23 to 25 show another (second) embodiment for reinforcing the coupling of the rotor 168 and the disk table 169. In this embodiment, a groove 175 for leading in a part of the synthetic resin forming the disk table 169 is formed in the outer peripheral surface of the skirt section 168b of the rotor 168. When the disk table 169 is outsert-molded, a part 169d of the resin on the table main body section 169a side is led into the groove 175, whereby the coupling of the rotor 168 and the disk table 169 is reinforced. In the second embodiment, the other components are the same as those in the first embodiment. Thus, the components identical with those in the first embodiment are denoted by the identical reference numerals and signs and redundant explanation is omitted.

Figure 26:
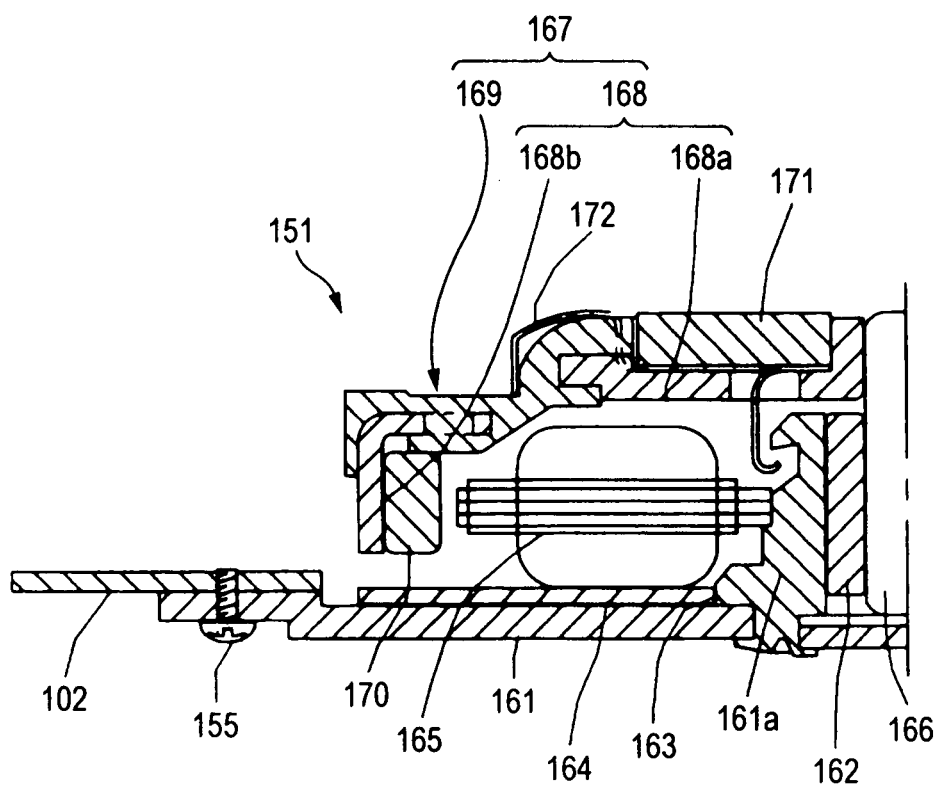
FIG. 26 is a sectional view of a spindle motor according to a third embodiment of the present invention.
Figure 27:
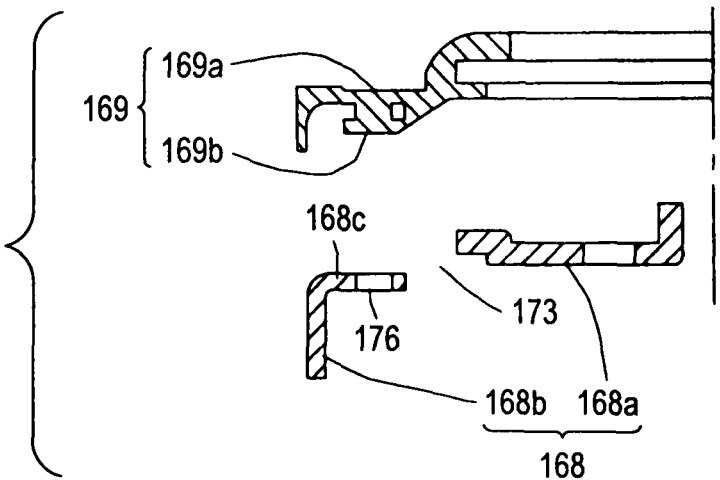
FIG. 27 is a disassembled sectional view of main parts of a rotor and a disk table of the spindle motor according to the third embodiment.
Figure 28:
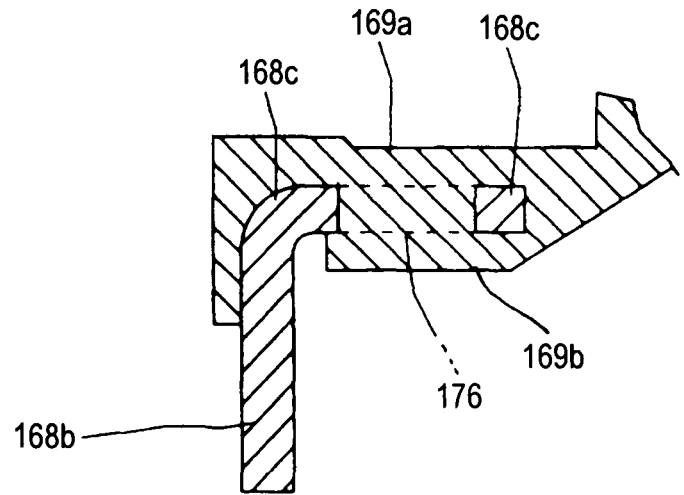
FIG. 28 is a sectional view of a state in which the main parts of the rotor and the disk table of the spindle motor according to the third embodiment are combined.

FIGS. 26 to 28 show still another (third) embodiment for reinforcing the coupling of the rotor 168 and the disk table 169. In this embodiment, the width of the ring-like flange section 168c provided at the upper end of the tubular skirt section 168b is set slightly larger than that in the first embodiment and second resin lead-in holes 176 are formed in the flange section 168c.

When the disk table 169 is outsert-molded in the rotor 168, the inner surface of the table main body section 169a and the outer surface of the rotor-inner-surface superimposing section 169b are coupled by the second resin lead-in holes 176, whereby the coupling of the rotor 168 and the disk table 169 is reinforced. In the third embodiment, the other components are the same as those in the first embodiment. Thus, the components identical with those in the first embodiment are denoted by the identical reference numerals and signs and redundant explanation is omitted.

Figure 29:
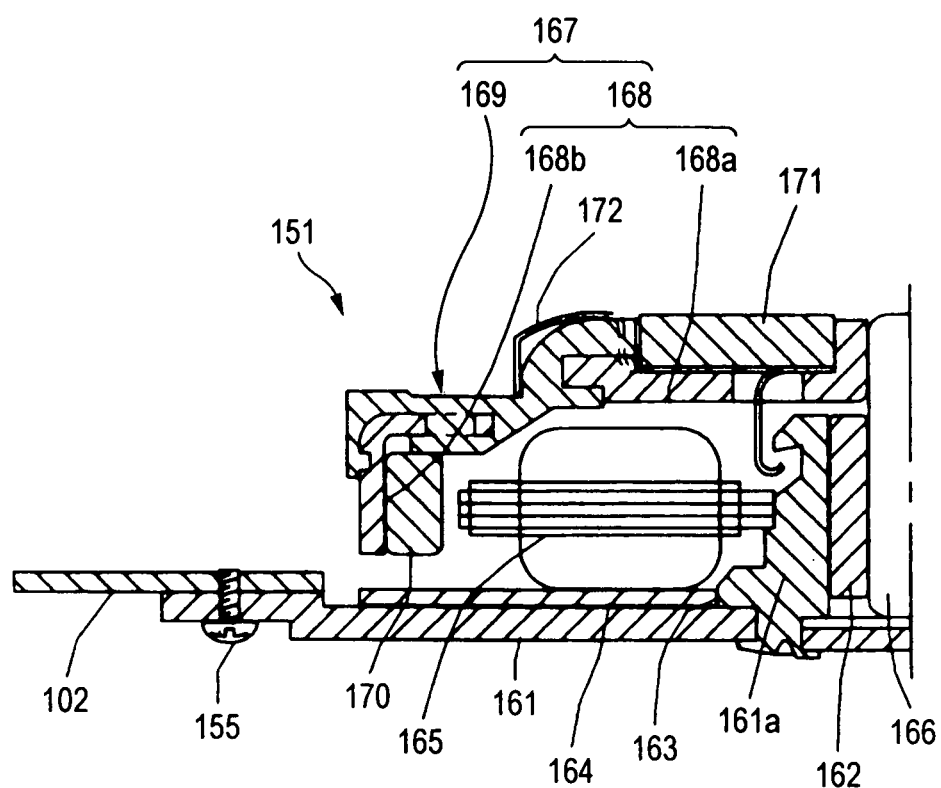
FIG. 29 is a sectional view of a spindle motor according to a fourth embodiment of the present invention.
Figure 30:
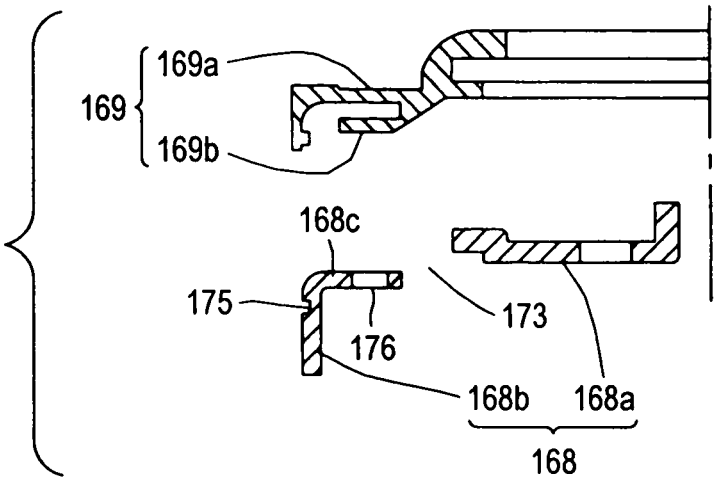
FIG. 30 is a disassembled sectional view of main parts of a rotor and a disk table of the spindle motor according to the fourth embodiment.
Figure 31:
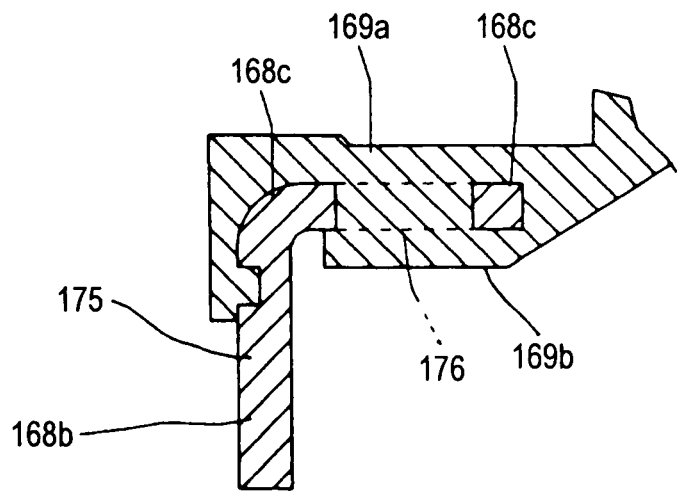
FIG. 31 is a sectional view of a state in which the main parts of the rotor and the disk table of the spindle motor according to the fourth embodiment are combined.

FIGS. 29 to 31 show still another (fourth) embodiment for reinforcing the coupling of the rotor 168 and the disk table 169. This embodiment is a combination of the second and third embodiments. The groove 175 for leading in a part of the synthetic resin forming the disk table 169 is formed in the outer peripheral surface of the skirt section 168b of the rotor 168 and the second resin lead-in holes 176 are provided in the flange section 168c. In this embodiment, both the effect of the second embodiment and the effect of the third embodiment are realized. In the fourth embodiment, the other components are the same as those in the second and third embodiments. Thus, the components identical with those in the second and third embodiments are denoted by the identical reference numerals and signs and redundant explanation is omitted.

In these embodiments, the rotor 168 includes the two components, i.e., the top surface section 168a and the tubular skirt section 168b. However, the top surface section 168a and the tubular skirt section 168b may be united and a hole for leading in resin corresponding the space 173 may formed between the top surface section 168a and the tubular skirt section 168b.

(3) Structure of the Thread Motor

Figure 32:
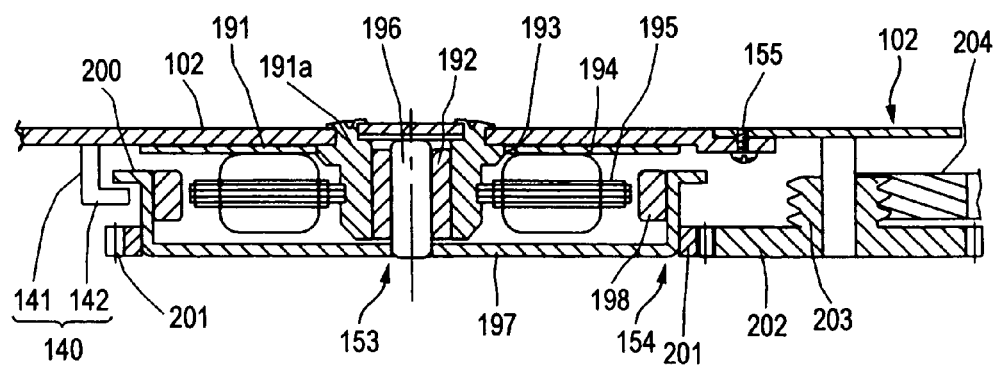
FIG. 32 is a sectional view of a thread motor.

As shown in FIG. 32, the thread motor 153 is attached to a stator substrate 191 serving as a motor support plate. The thread motor 153 is attached to the stator substrate 191 with the outer periphery of the stator substrate 191 superimposed on the lower surface of the chassis 102 and suspended from the lower surface of the chassis 102 by a screw 155 or the like.

The thread motor 153 includes a tubular bearing section 191a provided in the stator substrate 191, a bearing 192 attached to the inner periphery of the bearing section 191a, a wiring board 194 placed on the stator substrate 191 with the tubular bearing section 191a inserted in a center hole 193, an iron-core coil 195 attached to the outer periphery of the tubular bearing section 191, and a rotor 197 rotatably attached with the rotating shaft 196 inserted in the bearing 192. A rotor magnet 198 forming a pair with the iron-core coil 195 is provided on the inner surface of the rotor 197.

Figure 33:
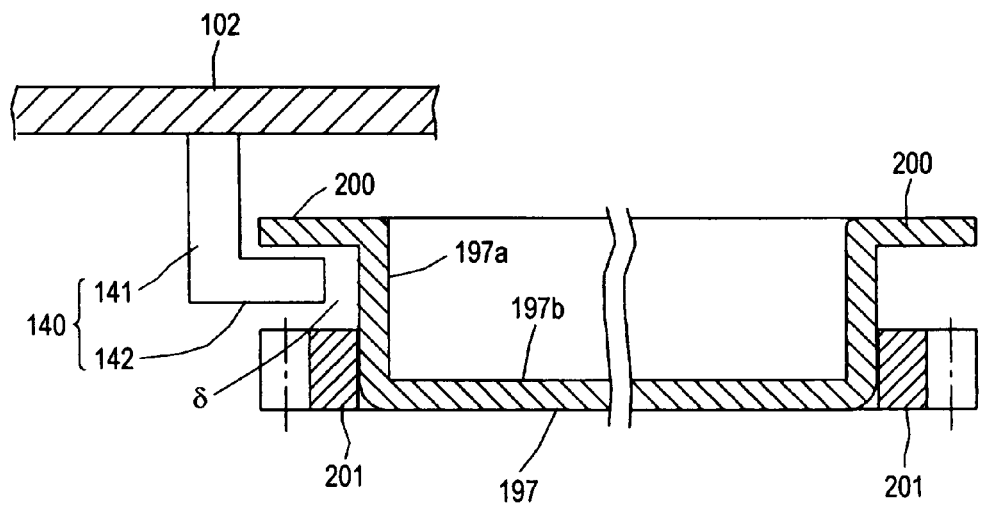
FIG. 33 is a sectional view of a rotor of the thread motor.
Figure 34:
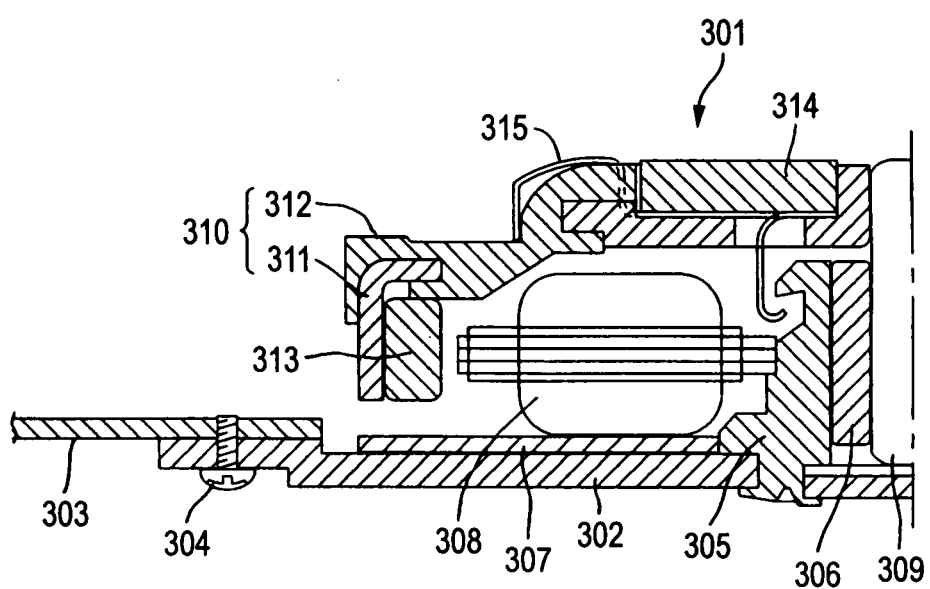
FIG. 34 is a sectional view of a spindle motor in the past.
Figure 35:
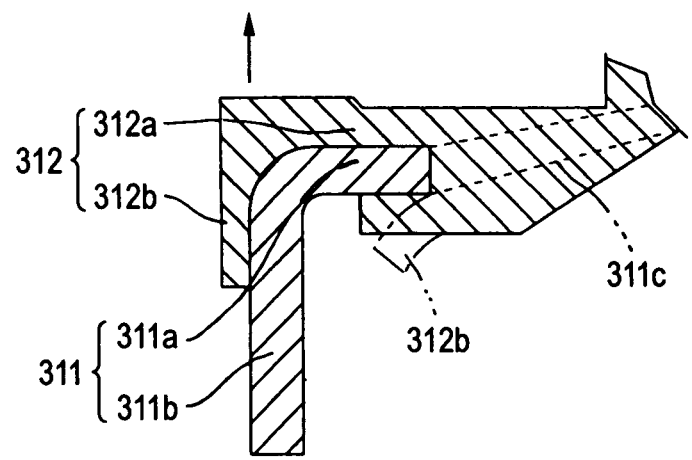
FIG. 35 is an enlarged view of a main part of the spindle motor.
Figure 36:
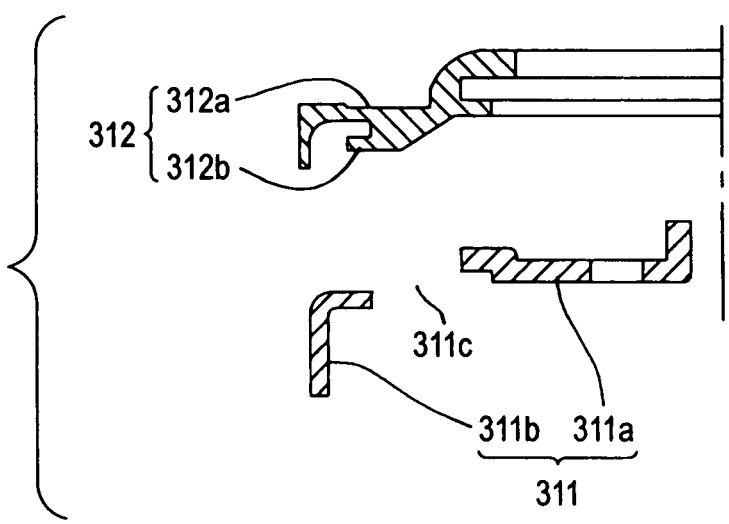
FIG. 36 is a sectional view of a state in which a rotor and a disk table of the spindle motor are separated.

As shown in FIG. 33, the rotor 197 is formed in a bottomed cylindrical shape by a cylindrical section 197a and a bottom surface section 197b. The rotor 197 includes a ring-like first gear 201 on the outer peripheral surface at the end on the bottom surface section 197b side of the cylindrical section 197a. The rotor 197 includes a flange section 200, which is opposed to the ring-like gear 201 at a predetermined space, at the end on the opposite side of the bottom surface section 197b side of the cylindrical section 197a.

The ring-like first gear 201 is integrally molded on the outer surface of the rotor 197 by outsert or the like or is attached to the outer surface of the rotor 197 by being fit therein. The flange section 200 is formed by bending the end on an opening side of the rotor 197 to the outer side at a substantially right angle or is formed on the outer surface of the rotor 197 by outsert or the like.

The rotation of the rotor 197 of the thread motor 153 is transmitted to the optical pickup 152 via the ring-like first gear 201 and the transmission gear group 154 explained later.

(4) Structure of a Motor-Drop Preventing Section

A motor-drop preventing section 140 is a section for preventing the thread motor 153 from dropping from the chassis 102 because of, for example, loosening of the screw 155. As shown in FIGS. 32 and 33, the motor-drop preventing section 140 is formed in a substantially L shape by a vertical piece 141 formed substantially vertically along the outer peripheral surface of the thread motor 153 on the lower surface side of the chassis 103 and a horizontal piece 142 formed by bending the tip of the vertical piece 141 at a substantially right angle toward the center of the thread motor. The tip of the horizontal piece 142 is inserted between a ring-like gear 199 provided on the outer peripheral surface of the rotor 197 and the flange section 200.

The vertical piece 141 may have elasticity and may be bent to permit the horizontal piece 142 to escape such that the horizontal piece 142 does not interfere with the attachment of the thread motor 153 to the chassis 102.

The motor-drop preventing section 140 is formed by cutting and raising the chassis 102 or is formed by outsert-molding in the chassis 102.

The motor-drop preventing section 140 has the structure described above. When the thread motor 153 moves in a direction in which the thread motor 153 drops from the chassis 102, the horizontal piece 142 of the motor-drop preventing section 140 engages with the flange section 200 of the rotor 197, prevents further movement of the thread motor 153 in the drop direction, and prevents the thread motor 153 from dropping from the chassis 102.

(5) Structure of the Transmission Gear Group

The transmission gear group 154 transmits the rotation of the thread motor 153 to the optical pickup 152 side and causes the optical pickup 152 to travel. As shown in FIG. 5, the transmission gear group 154 includes a second gear 202 that meshes with the ring-like gear (hereinafter referred to as first gear) 201 provided on the outer peripheral surface of the rotor 197, a third gear 203 formed coaxially with the second gear 202 on the upper surface (a surface opposed to the chassis 102) of the second gear 202, a fourth gear 204 that meshes with the third gear 204, and a fifth gear 205 that meshes with the fourth gear 204. The fifth gear 205 is attached to the end of a lead screw 185 of the optical pickup 152.

A flat gear (a spur gear) is used as the second gear 202. A worm gear is used as the third gear 203. A shaft-like worm gear is used as the fourth gear 204. A worm gear is used as the fifth gear 205.

In the fourth gear 204, one end 204a and the other end 204b are formed as reverse screws with the center in the length direction as a boundary. The third gear 203 meshes with the one end 204a and the fifth gear 205 meshes with the other end 204b. The thread motor 153 rotates the lead screw 185 via the first gear 201, the second gear 202, the third gear 203, the fourth gear 204, and the fifth gear 205 to thereby cause the optical pickup 152 to travel.

As described above, the ring-like first gear 201 is provided on the outer peripheral surface of the rotor 197 of the thread motor 153 and the flat second gear 202 is meshed with the first gear 201. Thus, it is possible to reduce the thickness of the thread motor and reduce a size and the thickness of a mechanical assembly compared with the thread motor in which the first gear is attached to be superimposed on the bottom surface of the rotor.

(6) Structure of the Optical Pickup

As shown in FIG. 5, the optical pickup 152 includes an object-lens driving device 181 and a moving stand 182 that moves the object-lens driving device 181 in a radial direction of the disk-like recording medium 2 chucked on the disk table 169.

The moving stand 182 includes a first bearing section 183 and a second bearing section 184. The lead screw 185 is attached to the first bearing section 183. A guide section 186 is attached to the second bearing section 184.

The lead screw 185 is rotatably supported by a pair of bearings 187 on the lower surface side of the chassis 102. The guide section 186 is formed integrally with the chassis 102 by outsert-molding.

The optical pickup 152 rotates the lead screw 185 to thereby move in the radial direction of the optical disk on the disk table 169 and performs recording and playing of the optical disk. The optical pickup 152 is capable of performing not only playing but also recording.

(7) Structure of the Disk Cartridge Eject Mechanism

As described above, the disk cartridge eject mechanism 107 is a mechanism for ejecting the disk cartridge 1 from the cartridge holder 101 after recording and playing are finished. The disk cartridge eject mechanism 107 includes the eject lever 104, the eject spring 105, and the damper spring 106.

Figure 9A:
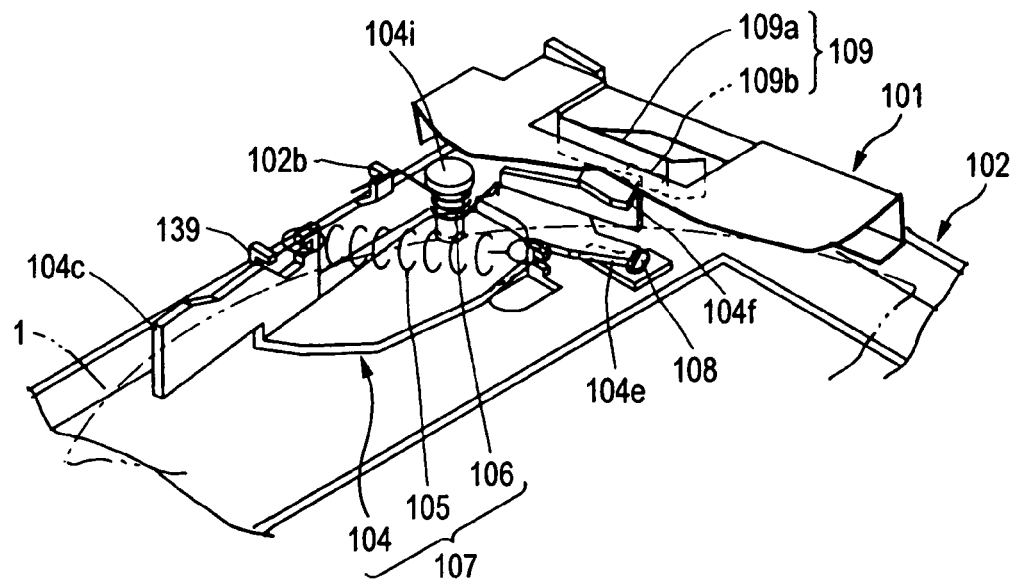
FIG. 9A is a perspective view of a state in which an eject lever is unlocked and slightly return-rotates.
Figure 9B:
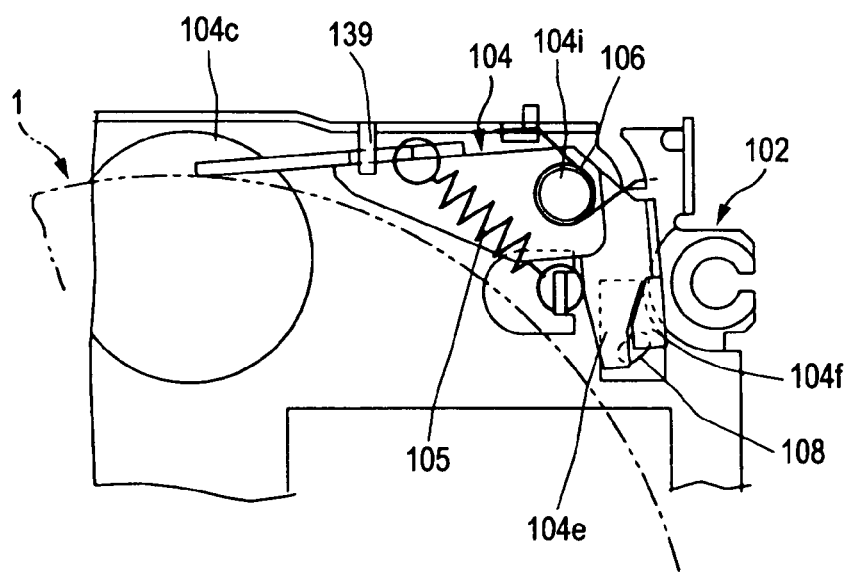
FIG. 9B is a plan view of the state of the eject lever.

As shown in FIGS. 9A and 9B, the disk cartridge eject mechanism 107 including the eject lever 104, the eject spring 105, and the damper spring 106 is arranged in a space formed by the front surface of the disk cartridge 1 housed in the cartridge holder 101, the upper surface of the chassis 102, and the lower surface of the cartridge holder 101, i.e., a so-called dead space.

When the disk cartridge 1 is inserted, the eject lever 104 is pushed by the front surface of a cartridge main body 3, rotates against a spring force of the eject spring 105, and is locked to be unable to return-rotate by the eject-lever lock section 108 provided in the chassis 102. After recording and playing are finished, when the cartridge holder 101 is moved to the cartridge inserting and removing position, the eject lever 104 is unlocked from the eject-lever lock section 108 by the eject-lever unlock section 109 explained later, return-rotates with the spring force of the eject spring 105, and ejects the disk cartridge 1 from the cartridge holder 101.

As shown in FIG. 5, the eject lever 104 includes a substantially L-shaped base section (a flat main section) 104a superimposed on the upper surface of the chassis 102, a pressed section 104c provided on one end side of the base section 104a via an arm section 104b and pressed by a front surface 3a of the cartridge main body 3 of the disk cartridge 1, a bearing hole 104d provided in the center of the base section 104a, the locked section 104e that is provided on the other end side of the base section 104a and engages with the eject-lever lock section 108 in a state in which the disk cartridge 1 is completely housed in the cartridge holder 101, the unlock-member engaging section 104f that is provided in an upper position near the locked section 104e and with which the eject-lever unlock section 109 provided in the cartridge holder 101 engages when the disk cartridge 1 is moved from the cartridge inserting and removing position to the recording and playing position, a first eject-spring locking section 104g provided at the end on the opposite side of the pressed section 104c of the arm section 104b, and a damper-spring contact section 104h that is provided in the center of the base section 104a and comes into contact with an end 106b of the damper spring 106 explained later when the eject lever 104 rotates a predetermined angle.

The eject lever 104 is attached to the upper surface of the chassis 102 such that the center of the base section 104a is rotatable by the shaft 104i and it is possible to slightly lift the base section 104a and the locked section 104e from the upper surface of the chassis 102.

A helical tension spring is used as the eject spring 105. One end 105a of the eject spring 105 is locked to the first eject-spring locking section 104g provided in the eject lever 104 and the other end 105b thereof is locked to a second eject-spring locking section 102a provided on the upper surface of the chassis 102. The eject spring 105 gives a rotating force in a disk cartridge ejecting direction to the eject lever 104 and gives a force for pressing the base section 104a of the eject lever 104 against the upper surface of the chassis 102 to the eject lever 104. The eject-lever lock section 108 is arranged near a position to which a line connecting the first eject-spring locking section 104g and the second eject-spring locking section 102a is extended.

The damper spring 106 is a spring that prevents, when the eject lever 104 return-rotates a predetermined angle with the spring force of the eject spring 105, the disk cartridge 1 from dropping from the cartridge holder 101 by giving a braking force to the eject lever 104 to lessen rotating speed of the eject lever 104. A helical torsion spring is used as the damper spring 106.

The damper spring 106 is attached to the outer periphery of the shaft section 104i and one end 106a thereof is engaged with a damper-spring locking section 102b provided in the chassis 102. The other end 106b of the damper spring 106 is inserted in a damper-spring-end receiving groove 102c provided in the chassis 102.

Figure 6A:
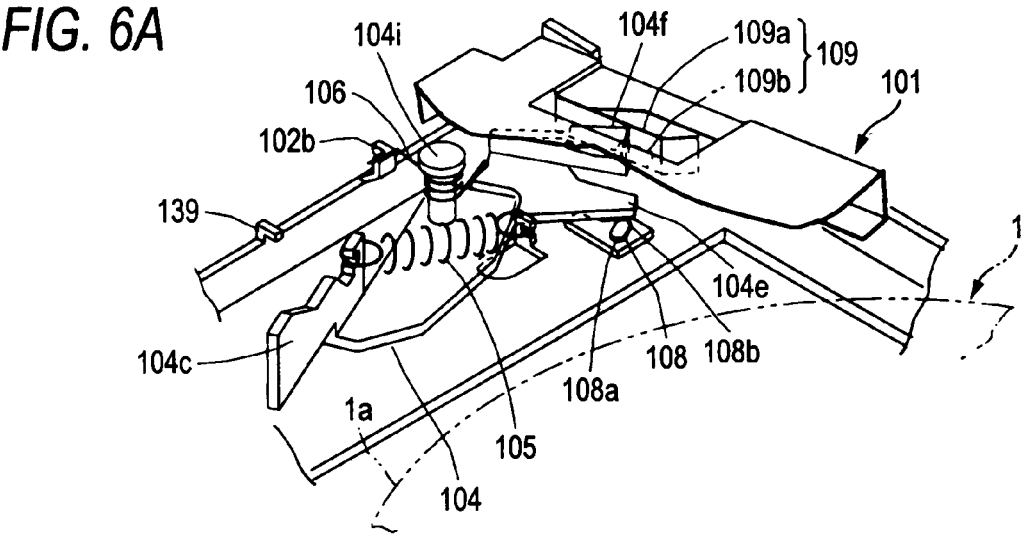
FIG. 6A is a perspective view of an eject lever section in an unlocked state.
Figure 6B:
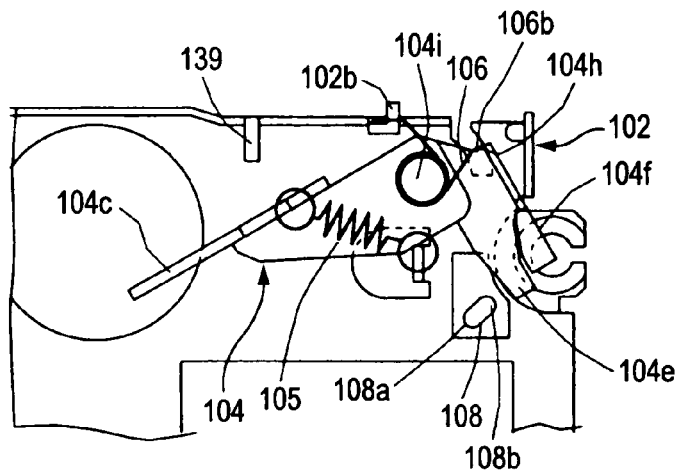
FIG. 6B is a plan view of the eject lever section in the unlocked state.
Figure 6C:
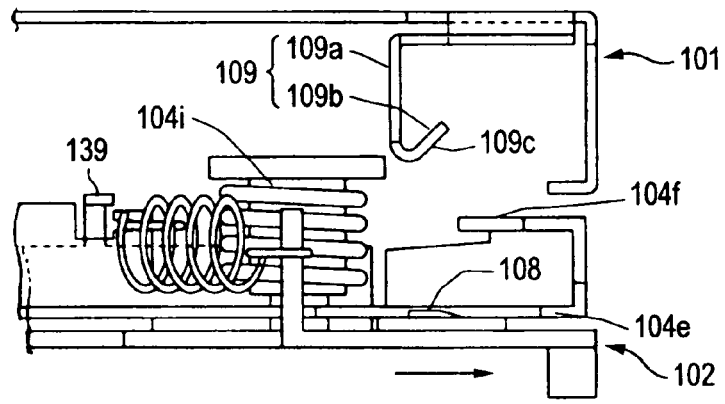
FIG. 6C is a side view of the eject lever section in the unlocked state.

As shown in FIG. 7B, in a state in which the eject lever 104 is locked by the eject-lever lock section 108, the other end 106b of the damper spring 106 is in contact with the end of the receiving groove 102c. When the eject lever 104 return-rotates a predetermined angle in the direction for ejecting the disk cartridge with the spring force of the eject spring 105, as shown in FIG. 6B, the damper-spring contact section 104h of the eject lever 104 comes into contact with the other end 106b of the damper spring 106, twists the damper spring 106, causes the damper spring 106 to generate a spring force in a direction opposite to the direction of the spring force of the eject spring 105, and gives a braking force to the eject lever 104.

The disk cartridge eject mechanism 107 has the structure described above. As shown in FIG. 1, when the disk cartridge 1 is inserted into the cartridge holder 101 in the cartridge inserting and removing position (a state in which the cartridge holder 101 is inclined a predetermined inclination angle θ with respect to the chassis 102), the pressed section 104c is pushed by the front surface of the cartridge main body 3 and rotates against the spring force of the eject spring 105. When the disk cartridge 1 is completely housed in the cartridge holder 101, as shown in FIG. 2, the locked section 104e on the outer side surface of the flat main section 104a of the eject lever 104 engages with the eject-lever lock section 108 and is locked to be unable to return-rotate. As shown in FIG. 3, even when the cartridge holder 101 is moved to the recording and playing position, the eject lever 104 maintains the cartridge holder 101 to be unable to return-rotate.

Figure 10:
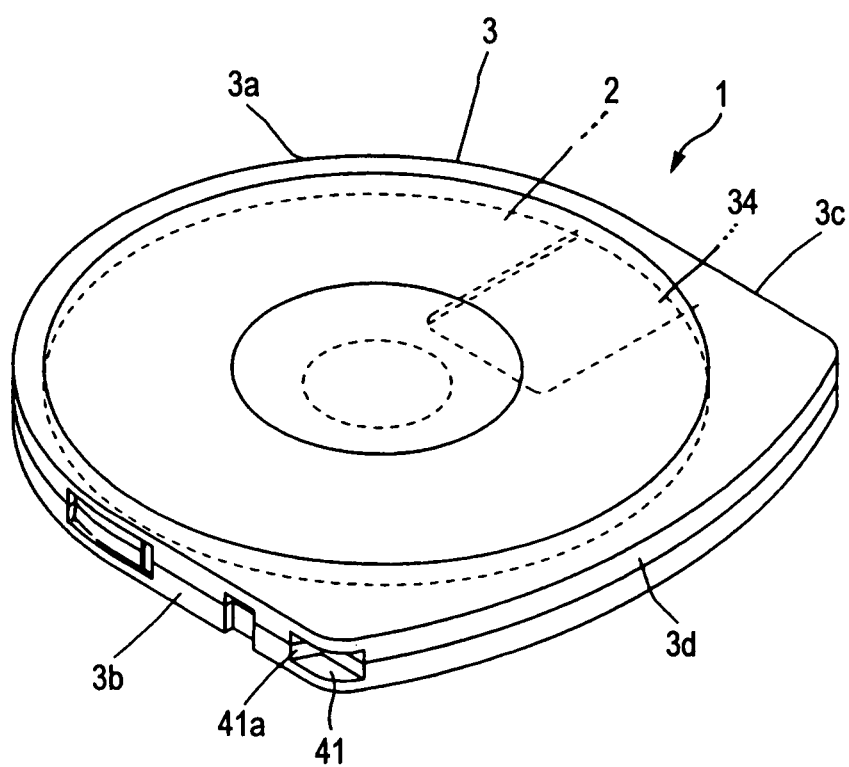
FIG. 10 is a perspective view of the disk cartridge.

After the recording and playing are finished, when the cartridge holder 101 is rotated from the recording and playing position to the cartridge inserting and removing position, as shown in FIGS. 9 and 10, the eject lever 104 is unlocked by the eject-lever unlock section 109. Therefore, the eject lever 104 return-rotates with the spring force of the eject spring 105 and ejects the disk cartridge 1 from the cartridge holder 101. In this case, the return rotation of the eject lever 104 is lessened by the damper spring 106 to prevent the disk cartridge 1 from dropping from the cartridge holder 101 without being stopped when the disk cartridge 1 is pushed out.

(8) Structure of the Eject-Lever Unlock Section

The eject-lever unlock section 109 is a section that unlocks, when the cartridge holder 102 is rotated from the recording and playing position to the cartridge inserting and removing position, the eject lever 104 locked by the eject-lever lock section 108, causes the eject lever 104 to return-rotate with the spring force of the eject spring 105, and ejects the disk cartridge 1 from the cartridge holder 101. The eject-lever unlock section 109 is also called a ratchet member because of functions thereof.

As shown in FIGS. 6A to 6C to FIGS. 8A to 8C, the eject-lever unlock section 109 is provided in the cartridge holder 101. The eject-lever unlock section 109 engages the cartridge holder 101 on the lower surface side of the unlock-member engaging section 104f provided in the eject lever 104 while the cartridge holder 101 is moved from the cartridge inserting and removing position to the recording and playing position. When the cartridge holder 101 is moved from the recording and playing position to the cartridge inserting and removing position, the eject-lever unlock section 109 slightly lifts the base section 104a and the locked section 104e from the upper surface of the chassis 102 via the unlock-member engaging section 104f and disengages the locked section 104e and the eject-lever lock section 108.

As shown in FIGS. 8A to 8C, the eject-lever unlock section 109 includes the arm section 109a having elasticity (flexibility) and the pawl 109b formed by bending the tip of the arm section 109a at an acute angle with respect to the arm section 109a.

While the cartridge holder 101 is moved from the cartridge inserting and removing position to the recording and playing position, the inclined surface 109c of the pawl 109b of the eject-lever unlock section 109 comes into contact with the side of the unlock-member engaging section 104f and moves to escape and the inclined surface 109c of the pawl 109b and the side of the unlock-member engaging section 104f are disengaged. Then, the pawl 109b returns to the original position and the tip 109d of the pawl 109b enters the lower surface side of the unlock-member engaging section 104f.

The eject-lever unlock section 109 is formed by cutting and raising a part of the cartridge holder 101 or by attaching a member formed separately from the cartridge holder 101 to the cartridge holder 101.

Actions of the eject-lever unlock section 109 are explained. As shown in FIG. 1, when the disk cartridge 1 is inserted into the cartridge holder 101 present in the cartridge inserting and removing position, as described above, the pressed section 104c provided at one end of the eject lever 104 is pushed by the front surface of the disk cartridge 1. The eject lever 104 rotates against the spring force of the eject spring 104. The locked section 104e provided at the other end of the eject lever 104 engages with the eject-lever lock section 108 provided in the chassis 102 and the eject lever 104 is locked to be unable to return-rotate. In this state, as shown in FIG. 7C, the unlock-member engaging section 104f provided near the upper part of the locked section 104e of the eject lever 104 is located substantially right below the eject-lever unlock section 109 provided in the cartridge holder 101.

When the cartridge holder 101 is rotated toward the recording and playing position, as shown in FIG. 8A, the inclined surface 109c of the pawl 109b of the eject-lever unlock section 109 comes into contact with the side of the unlock-member engaging section 104f of the eject lever 104 and is pressed by the side. The arm section 109a bends and the pawl 109b moves in a direction of escape from the side of the unlock-member engaging section 104f.

When the cartridge holder 102 moves close to the recording and playing position, the inclined surface 109c of the pawl 109b and the side of the unlock-member engaging section 104f are disengaged. As shown in FIG. 8B, the pawl 109b return-moves because of the elasticity of the arm section 109a and the tip 109d of the pawl 109b enters on the lower surface of the unlock-member engaging section 104f. In this state, recording and playing of a disk are performed.

After the recording and playing are finished, when the cartridge holder 101 is rotated toward the cartridge inserting and removing position, as shown in FIG. 8C, the tip 109d of the pawl 109b of the eject-lever unlock section 109 engages with the lower surface of the unlock-member engaging section 104f. The base section 104a is lifted via the unlock-member engaging section 104f. As shown in FIGS. 9A and 9B, the locked section 104e of the eject lever 104 and the eject-lever lock section 108 provided in the chassis 102 are disengaged. The eject lever 104 rotates with the spring force of the eject spring 105 and pushes out the disk cartridge 1 from the cartridge holder 102.

(9) Structure of the Disk Cartridge

Figure 11:
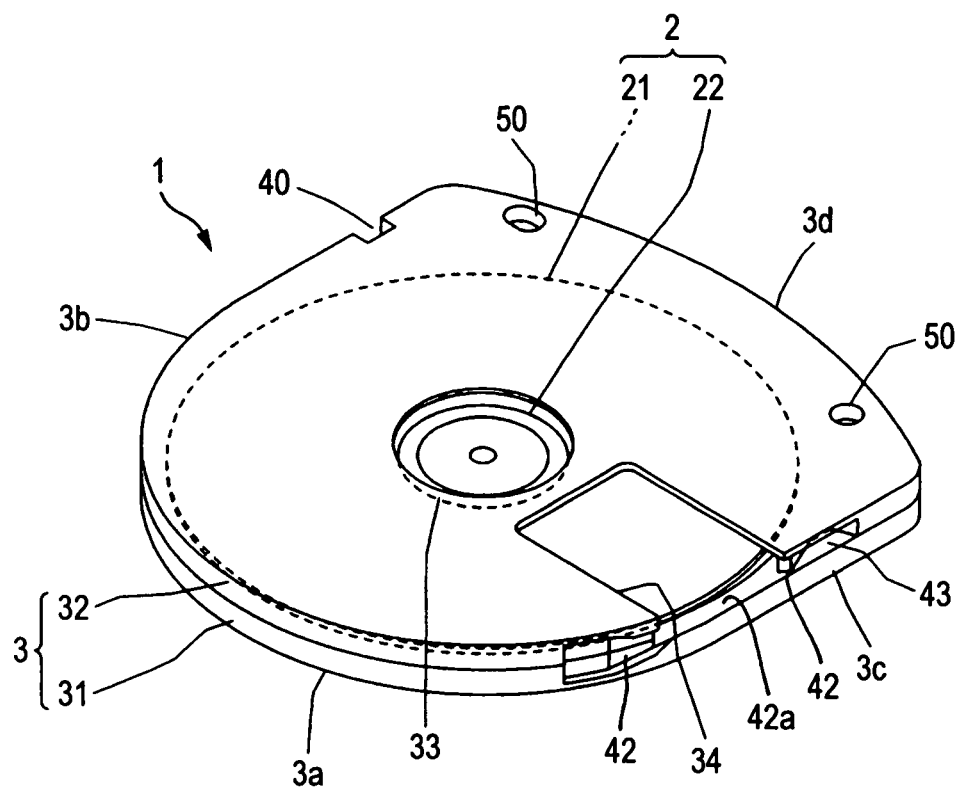
FIG. 11 is a perspective view of the disk cartridge viewed from the bottom surface side thereof.

FIG. 10 is a perspective view of the disk cartridge 1 viewed from an upper half side. FIG. 11 is a perspective view of the disk cartridge 1 viewed from a lower half side.

The disk cartridge 1 includes the disk-like recording medium 2 such as an optical disk and the cartridge main body 3 that rotatably houses the disk-like recording medium 2 in a circular disk housing section and includes a recording and playing opening 34 that exposes a part of the disk-like recording medium 2 to the outside. The disk cartridge 1 is a so-called shutter-less disk cartridge that does not include a shutter for opening and closing the recording and playing opening 34.

As shown in FIG. 11, the disk-like recording medium 2 is formed by attaching the chucking hub 22 in the center of the optical disk 21 in which software for a game or the like is recorded. The optical disk 21 is formed in a diameter as small as about 50 mm. The chucking hub 22 is formed of magnetic metal such as stainless steel that is attracted by a magnet.

The cartridge main body 3 is formed by joining peripheral walls of upper and lower halves 31 and 32 thereof. In the cartridge main body 3, the front surface 3a (a side on an end side of insertion in the player explained later) is formed as an arcuate surface (a semicircular surface) having a curvature radius substantially the same as that of the optical disk 21. First and second sides 3b and 3c on the left and right continuing to the front surface 3a are formed as flat surfaces parallel to each other. A rear surface 3d opposed to the front surface 3a is formed as a curved surface gently continuing to the first and second sides 3b and 3c on the left and right.

A driving opening 33 that exposes the hub 22 of the disk-like recording medium 2 to the outside is provided in the center of the lower half 32. A recording and playing opening 34 that exposes an information recording surface of the optical disk 21 of the disk-like recording medium 2 is provided from the vicinity of the driving opening 33 to the second side 3c.

As shown in FIG. 10, the disk cartridge 1 includes a first lateral-pressure releasing recess 41 in the first side 3b of the cartridge main body 3. When the disk cartridge 1 is completely housed in the cartridge holder 102, a projection 213 of a cartridge-drop preventing member 211 provided in a first side plate 101b (see FIG. 1) of the cartridge holder 101 explained next is fit in the recess 41. The recess 41 brings the projection 213 into a state of noncontact with the first side 3b of the cartridge main body 3 of the disk cartridge 1 to remove a lateral pressure applied to the cartridge holder 102 by the cartridge-drop preventing member 211.

As shown in FIG. 11, the disk cartridge 1 includes a guide groove 42 and a second lateral-pressure releasing recess 43 in the second side 3c of the cartridge main body 3. When the disk cartridge 1 is inserted into the cartridge holder 101, a cartridge insertion guide projection 214 provided in a second side plate 101c (see FIG. 17) of the cartridge holder 101 enters the guide groove 42 and guides the insertion of the disk cartridge 1. When the disk cartridge 1 is completely housed in the cartridge holder 101, the cartridge insertion guide projection 214 is fit in the second recess 43. The second recess 43 brings the projection 214 into a state of noncontact with the second side 3c of the cartridge main body 3 of the disk cartridge 1 and removes a lateral pressure applied to the cartridge holder 101 by the projection 214 for cartridge insertion guide. Positioning reference holes 50 in which cartridge positioning reference pins 122 provided in the chassis 102 are fit are provided near the rear surface 3d side of the lower surface of the cartridge main body 3.

The hub 22 of the disk-like recording medium 2 is magnetically chucked on the disk table of the player via the driving opening 33. Information is recorded in and reproduced from the optical disk 21 of the disk-like recording medium 2 by the optical pickup 152 via the recording and playing opening 34.

(10) Structure of the Cartridge Holder

As shown in FIG. 5, the cartridge holder 101 includes a substantially square upper surface plate (top surface plate) 101a, the left and right side plates (hereinafter referred to as first and second side plates) 101b and 101c formed by bending both the left and right sides of the upper surface plate 101a downward at a substantially right angle, a pair of first and second cartridge support sections 101d and 101e on the left and right that are formed by bending the lower ends of the first and second side plates 101b and 101c inward at a substantially right angle and support both the left and right sides of the lower surface of the inserted disk cartridge 1 and tongue-like third and fourth cartridge support sections 101f and 101g provided further on the inner side than the second cartridge support section 101e at a predetermined space, and receiving surface sections 101h and 101i formed by bending the front edges of the first and second cartridge support sections 101d and 101e downward. An inserting and removing port 101n for the disk cartridge 1 and a housing section 101p extending to the inserting and removing port 101n are formed by the upper surface plate 101a, the first and second side plates 101b and 101c, the pair of left and right cartridge support sections 101d and 101e, and the like.

The eject-lever unlock section 109 is provided in a position of the upper surface plate 101a of the disk cartridge 1 located in an upper part in a space in which the disk cartridge eject mechanism 107 is arranged.

The eject-lever unlock section 109 is formed by cutting and raising a part of the upper surface plate 101a of the disk cartridge 1.

In the center of the upper surface plate 101a, a hexagonal opening 111 is punched out in order to reduce the weight of the upper surface plate 101a. On both the left and right sides of the opening 111 of the upper surface plate 101a, a pair of first and second leaf springs 112 and 113 on the left and right are formed substantially in parallel to a disk cartridge inserting direction by cutting and raising a part of the upper surface plate 101a. The first and second leaf springs 112 and 113 are bent such that free end sides at the tips thereof enter the housing section 101p. The first and second leaf springs 112 and 113 press the upper surface of the disk cartridge 1 inserted in the housing section 101p and press the disk cartridge 1 against the first to fourth cartridge support sections 101d to 101g.

Further on the front end side (the inserting and removing port 101n side) than the opening 111 of the upper surface plate 101a, a pair of third and fourth leaf springs 114 and 115 on the left and right extending from the center in a direction substantially orthogonal to the disk cartridge inserting direction is formed by cutting and raising a part of the upper surface plate 101a.

Figure 12:
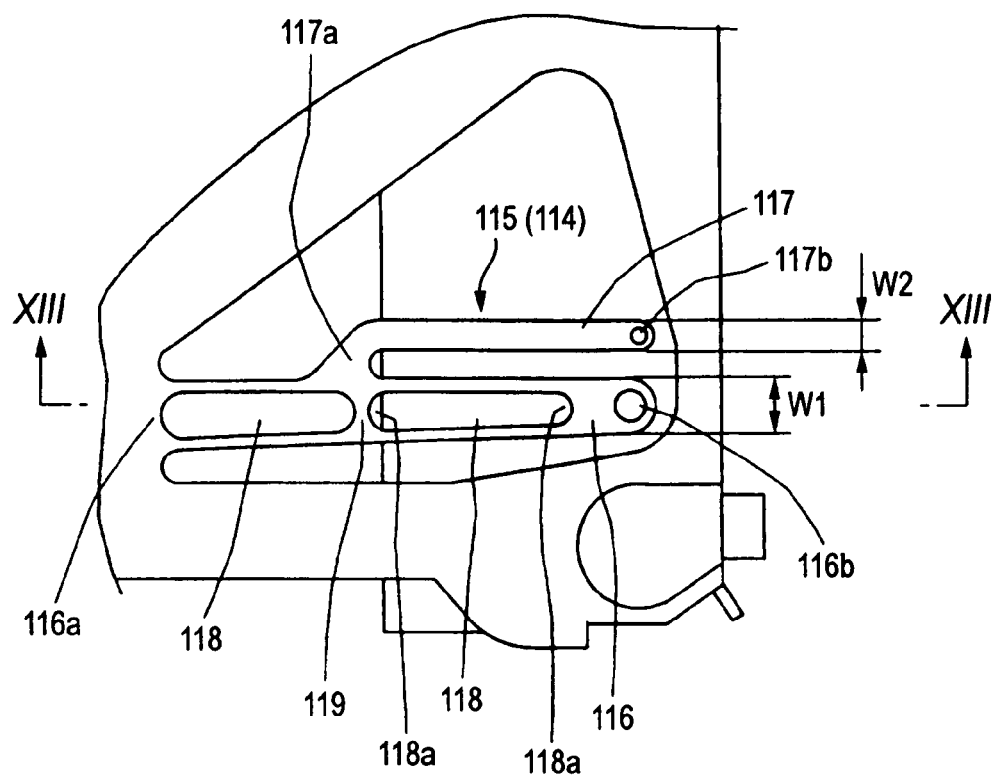
FIG. 12 is an enlarged view of a popup spring section.

As shown in FIG. 12 in enlargement, each of the third and fourth leaf springs 114 and 115 includes a spring section for cabinet lid popup (hereinafter referred to as popup spring) 116 of a thin and long plate shape and a spring section 117 for cartridge pressing (hereinafter referred to as cartridge pressing spring) of a thin and long plate shape branched from one side of the popup spring 116 and extending in parallel to the popup spring 116. Width W1 of the popup spring 116 is formed larger than width W2 of the cartridge pressing spring 117.

The popup spring 116 is formed in a so-called frame shape by a hollow-out section 118 extending in a length direction. A beam section 119 is provided in the hollow-out section 118. The beam section 119 is provided near a base portion of the cartridge pressing spring 117, i.e., a portion where the cartridge pressing spring 117 is branched from the popup spring 116.

Figure 13:
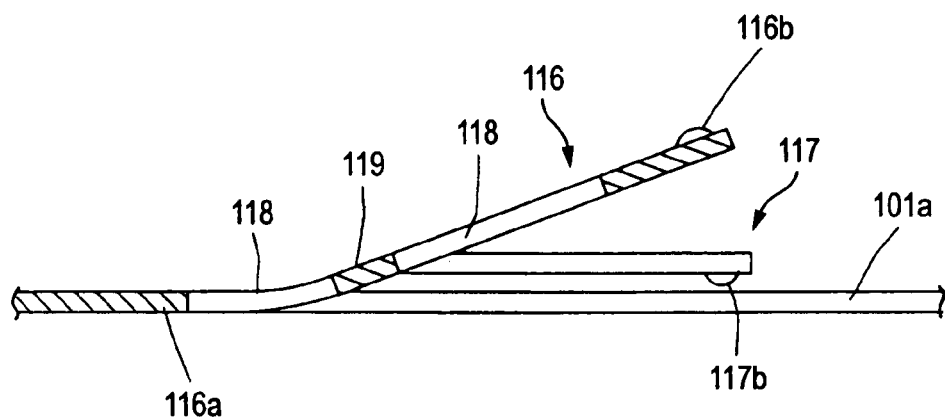
FIG. 13 is a sectional view of the popup spring section taken along line A-A in FIG. 12.

A base section 116a of the popup spring 116, a base section 117a of the cartridge pressing spring 117, and a base section 118a of the hollow-out section 118 are formed in a curved shape to prevent stresses generated when the popup spring 116 and the cartridge pressing spring 117 bend from concentrating on one place. As shown in FIG. 13, the popup spring 116 is bent in a gentle curved shape in the base section 116a to prevent a stress generated when the popup spring 116 bends from concentrating on one place. The cartridge pressing spring 117 extends substantially in parallel to the upper surface plate 101a or parallel to the popup spring 116 from the middle of the popup spring 116.

Figure 14:
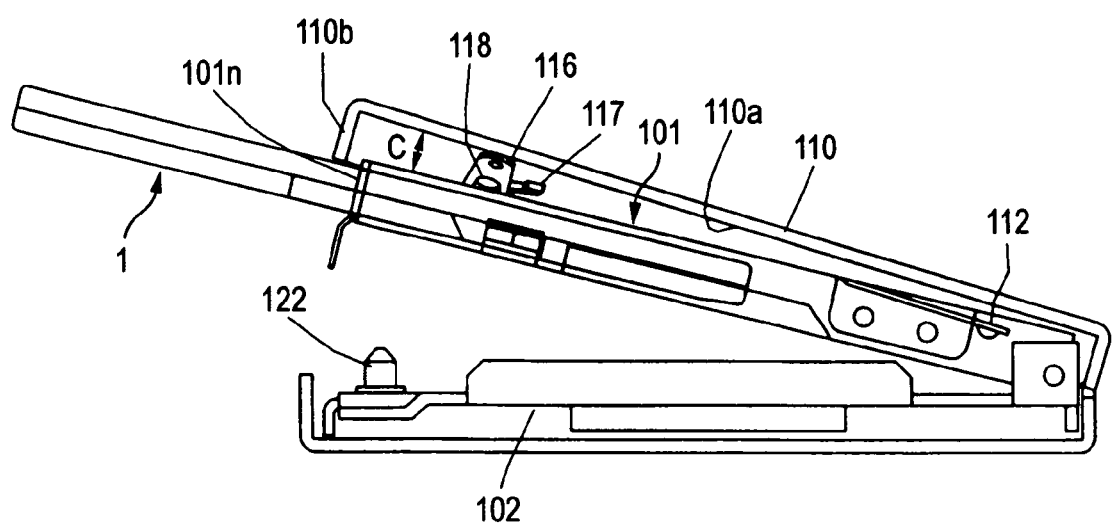
FIG. 14 is a side view of a state in which a cabinet lid is pushed up by a popup spring.
Figure 15:
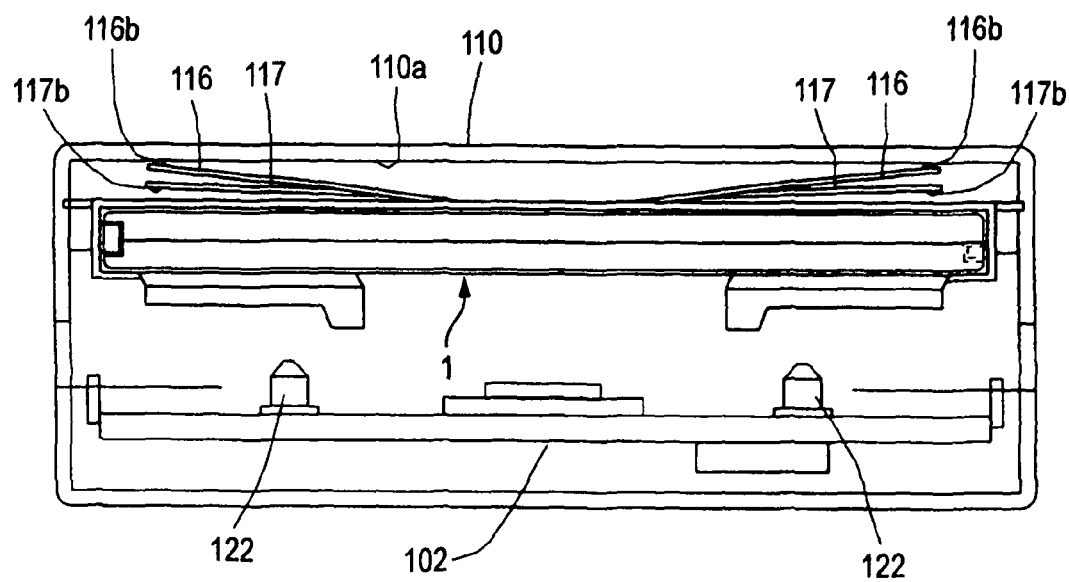
FIG. 15 is a front view of the state in which the cabinet lid is pushed up by the popup spring.

As shown in FIGS. 14 and 15, a tip 116b of the popup spring 116 comes into contact with an inner surface 110a of the cabinet lid 110 that rotates the cartridge holder 101 between the recording and playing position and the cartridge inserting and removing position.

Figure 16:
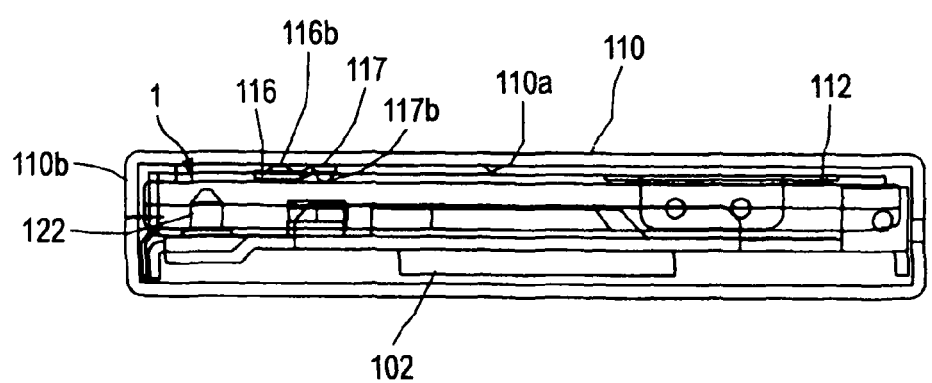
FIG. 16 is a side view of a state in which the cabinet lid is closed and the popup spring bends.

When the disk cartridge 1 is inserted in the cartridge holder 101 and the cabinet lid 110 is closed, as shown in FIG. 3, the cartridge holder 101 moves to the recording and playing position. As shown in FIG. 16, the tip 116b of the popup spring 116 is pushed by the inner surface 110a of the cabinet lid 110 and the popup spring 116 bends to the disk cartridge 1 side. When the popup spring 116 bends, a tip 117b of the cartridge pressing spring 117 branched from one side of the popup spring 116 comes into contact with the upper surface of the disk cartridge 1 and presses the disk cartridge 1 against the cartridge support section of the cartridge holder 101. At this point, a force in a twisting direction acts on the popup spring 116 according to a reaction of the cartridge pressing spring 117. However, the force in the twisting direction is dispersed to the entire area of the popup spring 116 by the beam section 119 and the like provided in the popup spring 116. The popup spring 116 is prevented from plastically deforming in the twisting direction.

As described above, recording and playing are performed in a state in which the disk cartridge 1 is pressed against the first to fourth cartridge support sections 101d to 101g by spring forces of the tips of the first and second leaf springs 112 and 113 and the popup spring 116 and the cartridge pressing spring 117 of the third and fourth leaf springs 114 and 115. When the cabinet lid 110 is opened after the recording and playing are finished, the cartridge holder 101 rotates to the cartridge inserting and removing position. As shown in FIG. 14, a predetermined clearance C is formed between the cartridge holder 101 and the cabinet lid 110 by the popup spring 116, the closure of the cartridge inserting and removing port 101n of the cartridge holder 101 by the front surface plate 110b of the cabinet lid 110 is released, and the cartridge inserting and removing port 101n is opened.

As shown in FIG. 1, the cartridge-drop preventing member 211 that gives a braking force for the ejection of the disk cartridge 1 by the eject spring 105 and prevents the disk cartridge 1 from dropping from the cartridge holder 101 is cut and raised in the first side plate 101b of the cartridge holder 101. The cartridge-drop preventing member 211 includes an elastic piece 212 extending toward the cartridge inserting and removing port 101n side of the cartridge holder 102 and the projection 213 that is provided at the tip of the elastic piece 212 and comes into slide contact with the first side 3b of the disk cartridge 1 when the disk cartridge 1 is ejected. When the disk cartridge 1 is completely housed in the cartridge holder 101, the projection 213 fits in the lateral-pressure releasing recess 41 provided in the first side 3b of the disk cartridge 1, comes into a state of noncontact with the first side 3b, and releases a lateral pressure.

Figure 17:
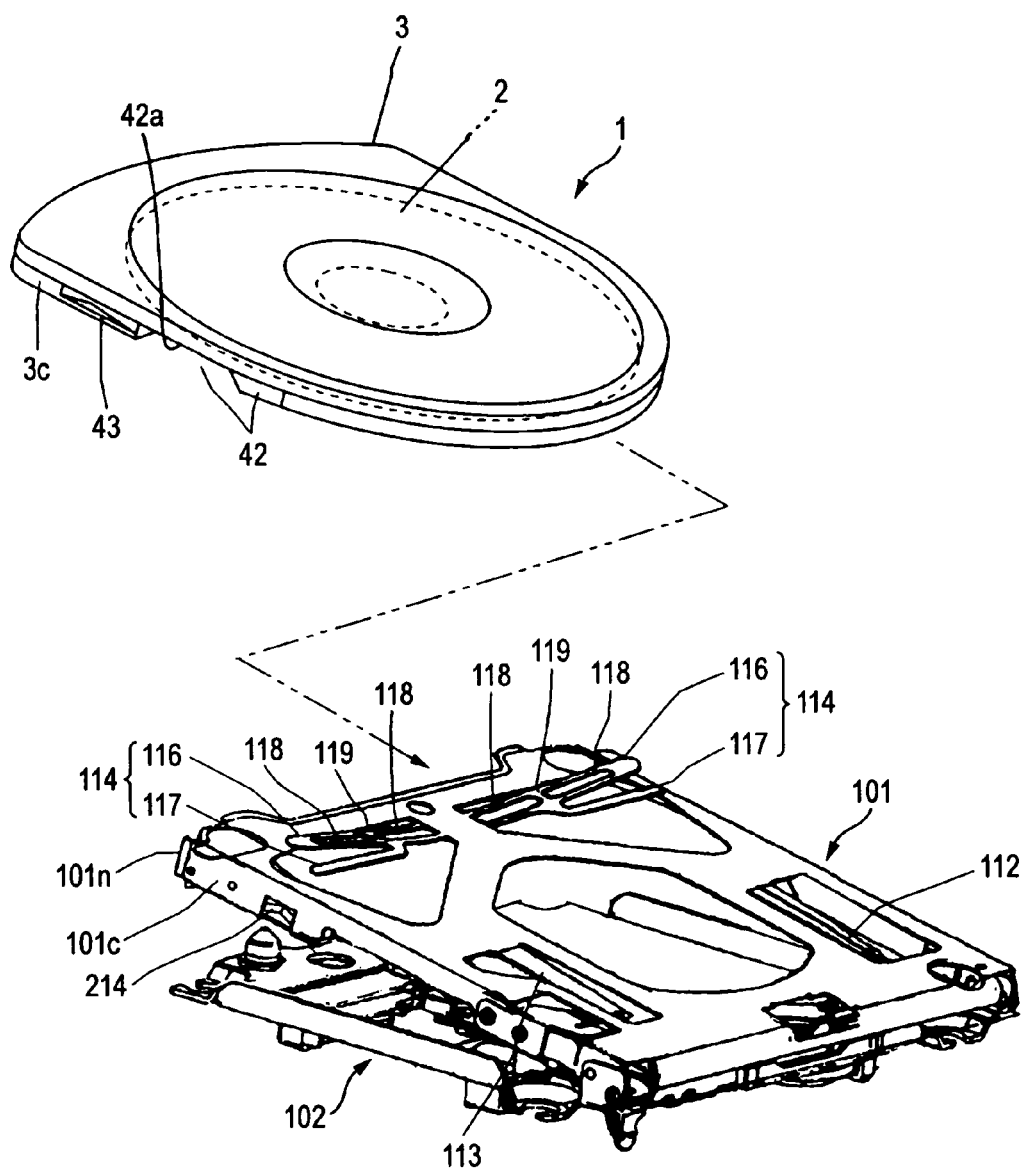
FIG. 17 is a perspective view of the cartridge holder viewed from a first side in which a cartridge insertion guide projection is provided.

As shown in FIG. 17, at the end on the cartridge inserting and removing port 101n of the second side plate 101c of the cartridge holder 101, the cartridge insertion guide projection 214 projecting into the cartridge housing section 101p is provided. The cartridge insertion guide projection 214 is cut and raised in substantially the center in the thickness direction of the second side plate 101c of the cartridge holder 101.

As shown in FIG. 17, when the disk cartridge 1 is inserted in the cartridge holder 101 in a normal posture, the cartridge insertion guide projection 214 is led into the guide groove 42 provided in the one side 3c of the disk cartridge 1. When the disk cartridge 1 is inserted to a predetermined position, the cartridge insertion guide projection 214 is located in the second lateral-pressure releasing recess 43 provided continuously to the tip of the guide groove 42 and comes into a state of noncontact with the disk cartridge 1.

Figure 18:
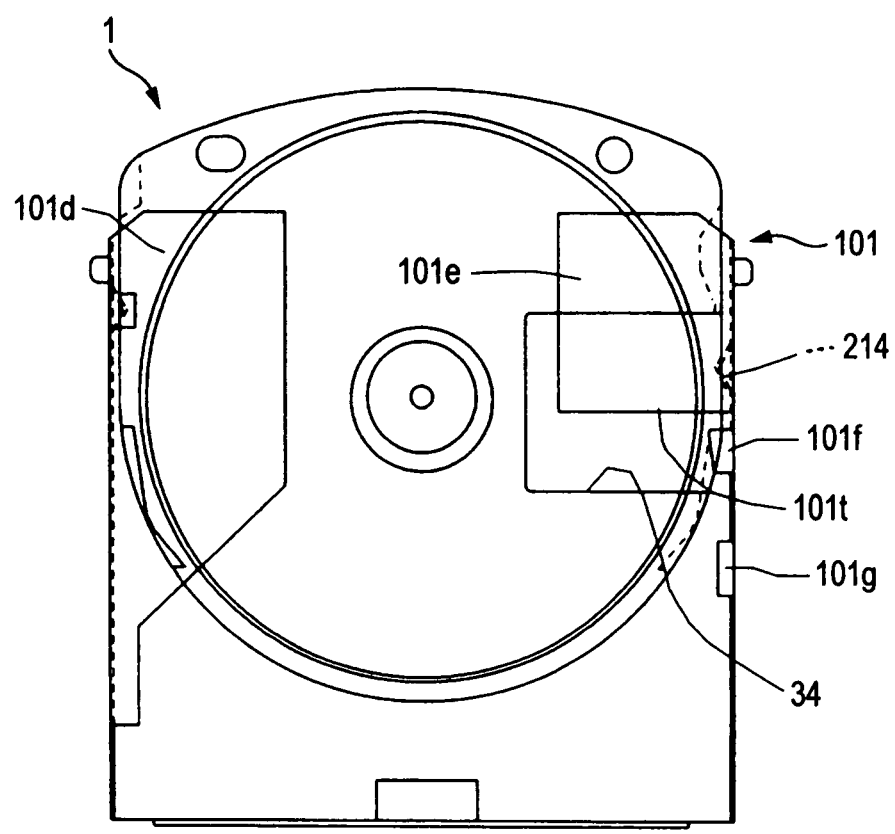
FIG. 18 is a bottom view of the disk cartridge showing an insertion process of the disk cartridge.
Figure 19:
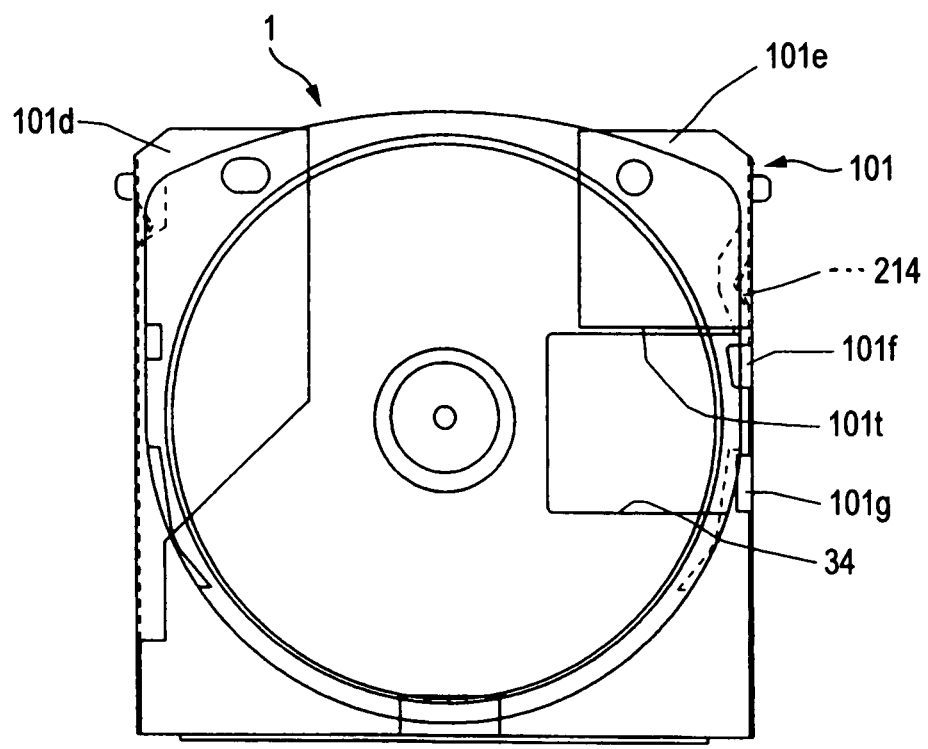
FIG. 19 is a bottom view of the disk cartridge in a housed state.

When the disk cartridge 1 is inserted into the cartridge holder 101, the cartridge insertion guide projection 214 guides the insertion of the disk cartridge 1. As shown in FIG. 18, the cartridge insertion guide projection 214 prevents the end 101t of the second cartridge support section 101e of the cartridge holder 101, the third cartridge support section 101f, or the like from entering the recording and playing opening 34 of the disk cartridge 1 to damage the information recording surface of the disk-like recording medium.

When the disk cartridge 1 is a disk cartridge of the shutter-less type, the recording and playing opening 34 is typically in an opened state. Thus, for example, when the disk cartridge 1 is inserted into the cartridge holder 101, if a strong push-down force is applied to the disk cartridge 1 because of some reason, the end 101t of the second cartridge support section 101e of the cartridge holder, the third cartridge support section 101f, or the like enters the recording and playing opening 34. Thus, it is likely that the information recording surface of the disk-like recording medium is scratched by the end 101t of the second cartridge support section 101e or the like or the outer peripheral surface of the disk-like recording medium in the disk cartridge 1 overlaps the second cartridge support section 101e. The cartridge insertion guide projection 214 comes into contact with an upper surface 42a of the guide groove 42, regulates the movement in the thickness direction of the disk cartridge 1, and prevents the end 101t of the second cartridge support section 101e of the cartridge holder 101, the third cartridge support section 101f, or the like from entering the recording and playing opening 34 and scratching the information recording surface of the disk-like recording medium or prevent the outer peripheral surface of the disk-like recording medium from overlapping the third cartridge support section 110f.

The cartridge insertion guide projection 214 acts as a mis-insertion preventing member that prevents mis-insertion of the disk cartridge 1. When the disk cartridge 1 is inserted with a wrong side up, the cartridge insertion guide projection 214 comes into contact with the side of the disk cartridge 1 to prevent further insertion of the disk cartridge 1. When the disk cartridge 1 is inserted with a wrong side front, the cartridge insertion guide projection 214 comes into contact with an end surface 41a of the first lateral pressure release groove 41 of the disk cartridge 1 to prevent further insertion of the disk cartridge 1. Mis-insertion of the disk cartridge 1 can be prevented by the third cartridge support section 101f shown in FIG. 5 when the cartridge insertion guide projection 214 is not provided. However, since the cartridge insertion guide projection 214 is provided in a position closer to the cartridge inserting and removing port 101n than the third cartridge support section 101f, when the disk cartridge 1 is mis-inserted, it is possible to prevent further insertion of the disk cartridge 1 at an earlier stage.

(11) Structure of the Chassis

As shown in FIG. 5, the chassis 102 is formed by a metal plate in a substantially square shape. Damper attaching sections 131 are provided at four corners of the chassis 102. Dampers 132 of rubber are attached to the damper attaching sections 131. On the left and right sides of the chassis 102, left and right sidewalls 133 and 134 located on the outer sides of the first and second side plates 101b and 101c of the cartridge holder 101 are provided. On one end sides of the left and right sidewalls 133 and 134, a pair of bearing sections 135 and 136 for rotatably attaching the cartridge holder 101 are provided. Shafts 137 and 138 provided on the inner surfaces of the bearing sections 135 and 136 are inserted in bearing holes 123 and 124 of the cartridge holder 101, whereby the cartridge holder 101 is rotatably supported between the cartridge inserting and removing position and the recording and playing position.

The chassis 102 includes cartridge positioning reference pins 122 that fit in the positioning reference holes 50 of the disk cartridge 1 via positioning lead-in holes 121 provided in the pair of left and right cartridge support sections 101d and 101e of the cartridge holder 101 when the cartridge holder 101 is moved to the recording and playing position.

The chassis 102 includes the eject-lever lock section 108 in a space formed by the front surface 3a of the disk cartridge 1 housed in the cartridge holder 101, the upper surface of the chassis 102, and the lower surface of the cartridge holder 101. As shown in FIGS. 7A to 7C, when the eject lever 104 is rotated, resisting the eject spring 105, to a position where the disk cartridge 1 is completely housed in the cartridge holder 101, the eject-lever lock section 108 engages with the locked section 104e of the eject lever 104 and locks the eject lever 104 to be unable to return-rotate.

The eject lever lock section 108 is formed by providing an elliptical projection on the upper surface of the chassis 102. As shown in FIG. 7D, the one end 108b of the eject-lever lock section 108 is formed as an inclined surface. The locked section 104e of the eject lever 104 surmounts the eject-lever lock section 108. On the other hand, the other end 108a of the eject lever lock section 108 is formed such that the locked section 104e of the eject lever 104 surely engages with the other end 108a.

When the base section 104a of the eject lever 104 is lifted from the chassis 102 against the spring force of the eject spring 105, the eject-lever lock section 108 is disengaged from the locked section 104e. In the eject lever 104 disengaged from the eject-lever lock section 108, the base section 104a overlaps the eject-lever lock section 108 and rotates. The eject lever 104 ejects the disk cartridge 1 from the cartridge holder 101.

As shown in FIGS. 9A and 9B, an eject-lever-lift preventing section 139 that prevents the vicinity of the pressed section 104c of the eject lever 104 from lifting in a state in which the eject lever 104 is locked by the eject-lever lock section 108 is provided in the chassis 102.

(12) Actions and Effects

The spindle motor and the player 101 according to the embodiments have the structure described above. As shown in FIG. 14, if the cabinet lid 110 is opened, the cartridge holder 101 rotates following the cabinet lid 110 and moves to the cartridge inserting and removing position. If the disk cartridge 1 is inserted in the cartridge holder 101 in the cartridge inserting and removing position, as described above, the center of the front surface 3a of the cartridge main body 3 comes into contact with the pressed section 104c of the eject lever 104 and presses the pressed section 104c.

When the pressed section 104c is pressed, the eject lever 104 rotates against the spring force of the eject spring 105, the eject cartridge 1 is completely housed in the cartridge holder 101, and the eject lever 104 is locked to be unable to return-rotate by eject-lever lock section 108.

After the disk cartridge 1 is housed in the cartridge holder 101, if the cabinet lid 110 is closed, the cartridge holder 101 moves from the cartridge inserting and removing position to the recording and playing position following the cabinet lid 110.

When the cartridge holder 101 moves from the cartridge inserting and removing position to the recording and playing position, as shown in FIG. 8A, the side of the unlock-member engaging section 104f of the eject lever 104 comes into contact with the inclined surface 109c of the pawl 109b of the eject-lever unlock section 109, bends the arm section 109a of the eject-lever unlock section 109, and causes the pawl 109b to move in a so-called escape direction. When the contact of the inclined surface 109c and the side of the unlock-member engaging section 104f is released, the eject-lever unlock section 109 is elastically restored. As shown in FIG. 8B, the pawl 109b enters the lower surface side of the unlock-member engaging section 104f to be engageable with the lower surface.

After the recording and playing are finished, if the cabinet lid 110 is opened, the cartridge holder 101 rotates following the cabinet lid 110 and moves to the cartridge inserting and removing position. When the cartridge holder 101 moves from the cartridge inserting and removing position to the recording and playing position, as shown in FIG. 8C, the unlock-member engaging section 104f of the eject lever 104 is lifted by the pawl 109b of the eject-lever unlock section 109 and the eject lever 104 locked by the eject-lever lock unit 108 is unlocked. The eject lever 104 rotates with the spring force of the eject spring 105 and pushes out the disk cartridge 1 from the cartridge holder 101.

The spindle motor and the player according to the embodiments have the simple structure in which the resin lead-in holes are provided in the rotor of the spindle motor in the past or the groove is formed in the outer peripheral surface of the skirt section of the rotor. When the disk table is outsert-molded in the rotor, a part of the synthetic resin forming the disk table is led into the other resin lead-in holes and the groove. Consequently, the coupling of the rotor and the disk table is reinforced, lift and wobble of the disk table are surely prevented, and recording and playing of the disk is more surely performed.

It should be understood by those skilled in the art that various modifications, combinations, sub-combinations, and alterations may occur depending on design requirements and other factors insofar as they are within the scope of the appended claims or the equivalents thereof.

What is claimed is:

1. A spindle motor comprising:

a rotor made of metal including a substantially circular top surface section and a tabular skirt section arranged at a predetermined space from an outer periphery of the top surface section; and a disk table of synthetic resin outsert-molded in the rotor and including a table main body section located on an outer surface side of the rotor and a rotor-inner-surface superimposing section located on an inner surface side of the rotor, wherein first resin lead-in holes extend through a corner portion of the tubular skirt section and wherein an inner surface of the table main body section located on the outer surface side of the rotor is connected to the rotor-inner-surface superimposing section located on the inner surface side of the rotor through the first resin lead-in holes and a portion of the disk table extends through the first resin lead-in holes and over an outer side-wall surface of the tubular skirt.

2. A player comprising:

a rotor made of metal including a substantially circular top surface section and a tabular skirt section arranged at a predetermined space from an outer periphery of the top surface section;

a disk table of synthetic resin outsert-molded in the rotor and including a table main body section located on an outer surface side of the rotor and a rotor-inner-surface superimposing section located on an inner surface side of the rotor; and a playing unit that plays a disk mounted on the disk table, wherein first resin lead-in holes extend through a corner portion of the tubular skirt section and wherein an inner surface of the table main body section located on the outer surface side of the rotor is connected to the rotor-inner-surface superimposing section located on the inner surface side of the rotor through the first resin lead-in holes and a portion of the disk table extends through the first resin lead-in holes and over an outer side-wall surface of the tubular skirt.

3. A player comprising:

a rotor made of metal including a substantially circular top surface section and a tabular skirt section arranged at a predetermined space from an outer periphery of the top surface section;

a disk table of synthetic resin outsert-molded in the rotor and including a table main body section located on an outer surface side of the rotor and a rotor-inner-surface superimposing section located on an inner surface side of the rotor; and a playing unit that plays a disk mounted on the disk table, wherein a groove for leading in a part of the synthetic resin forming the disk table is formed in an outer peripheral surface of the skirt section of the rotor.

4. The spindle motor of claim 1, further comprising at least one permanent magnet supported at an inner surface of the tubular skirt section.

5. The spindle motor of claim 1, further comprising a centering spring supported at the table main body section.

6. The spindle motor of claim 1, further comprising a chucking magnet located on an outer surface of the rotor.

7. The spindle motor of claim 1, further comprising:
   a wiring board located adjacent the rotor; and
   an iron-core coil located adjacent the wiring board and within the tubular skirt section.

8. The player of claim 2, further comprising at least one permanent magnet supported at an inner surface of the tubular skirt section.

9. The player of claim 2, further comprising a centering spring supported at the table main body section.

10. The player of claim 2, further comprising a chucking magnet located on an outer surface of the rotor.

11. The player of claim 2, further comprising:
    a wiring board located adjacent the rotor; and
    an iron-core coil located adjacent the wiring board and within the tubular skirt section.

12. The player of claim 3, further comprising at least one permanent magnet supported at an inner surface of the tubular skirt section.

13. The player of claim 3, further comprising a centering spring supported at the table main body section.

14. The player of claim 3, further comprising a chucking magnet located on an outer surface of the rotor.

15. The player of claim 3, further comprising:
    a wiring board located adjacent the rotor; and
    an iron-core coil located adjacent the wiring board and within the tubular skirt section.

* * * * *